April 4, 1961  E. H. L. JOHANNES  2,977,902
APPARATUS FOR TRIMMING AND CUTTING
PREDETERMINED LENGTHS OF SPAGHETTI
Filed May 16, 1957  19 Sheets-Sheet 2
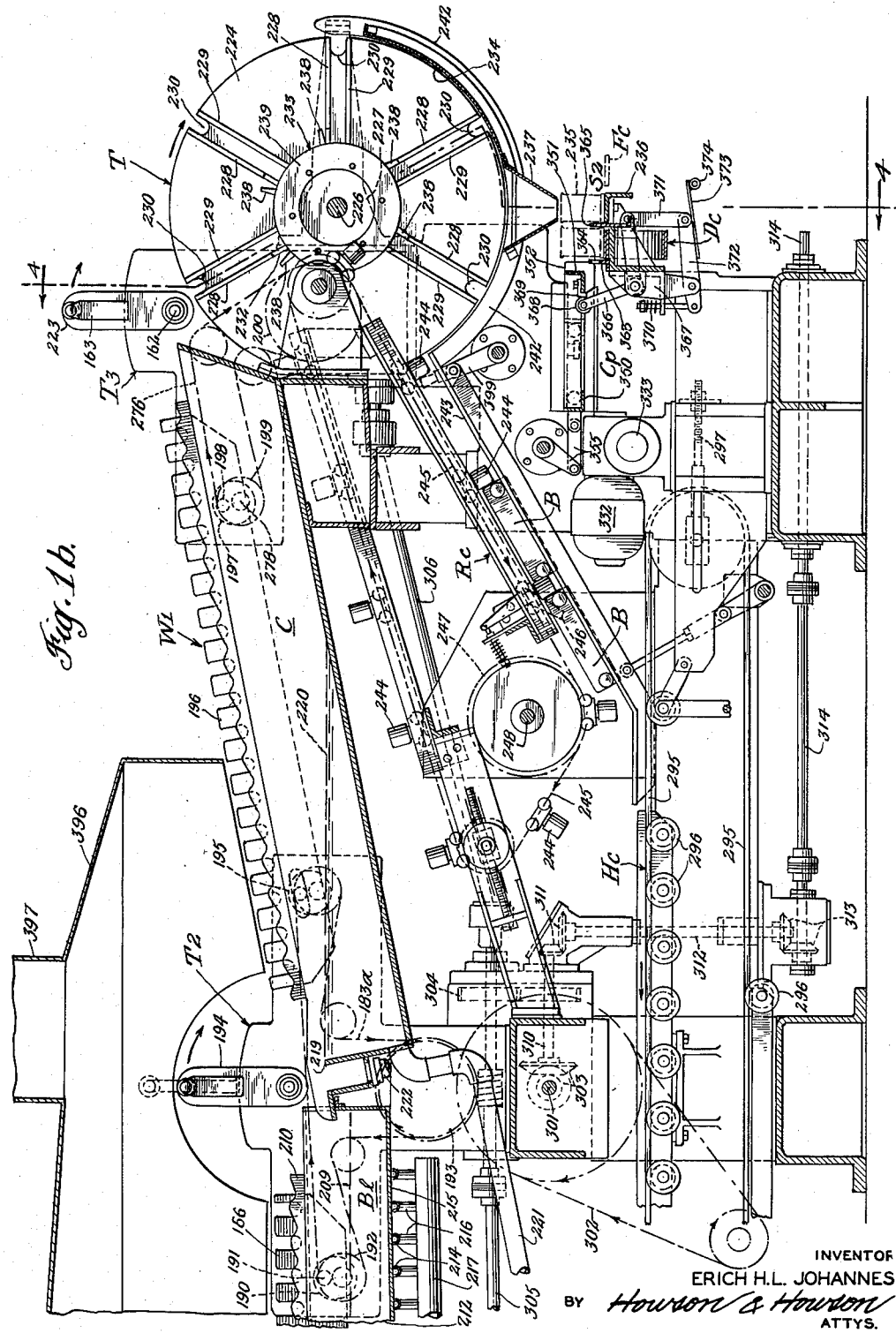
INVENTOR
ERICH H.L. JOHANNES
BY Howson & Howson
ATTYS.

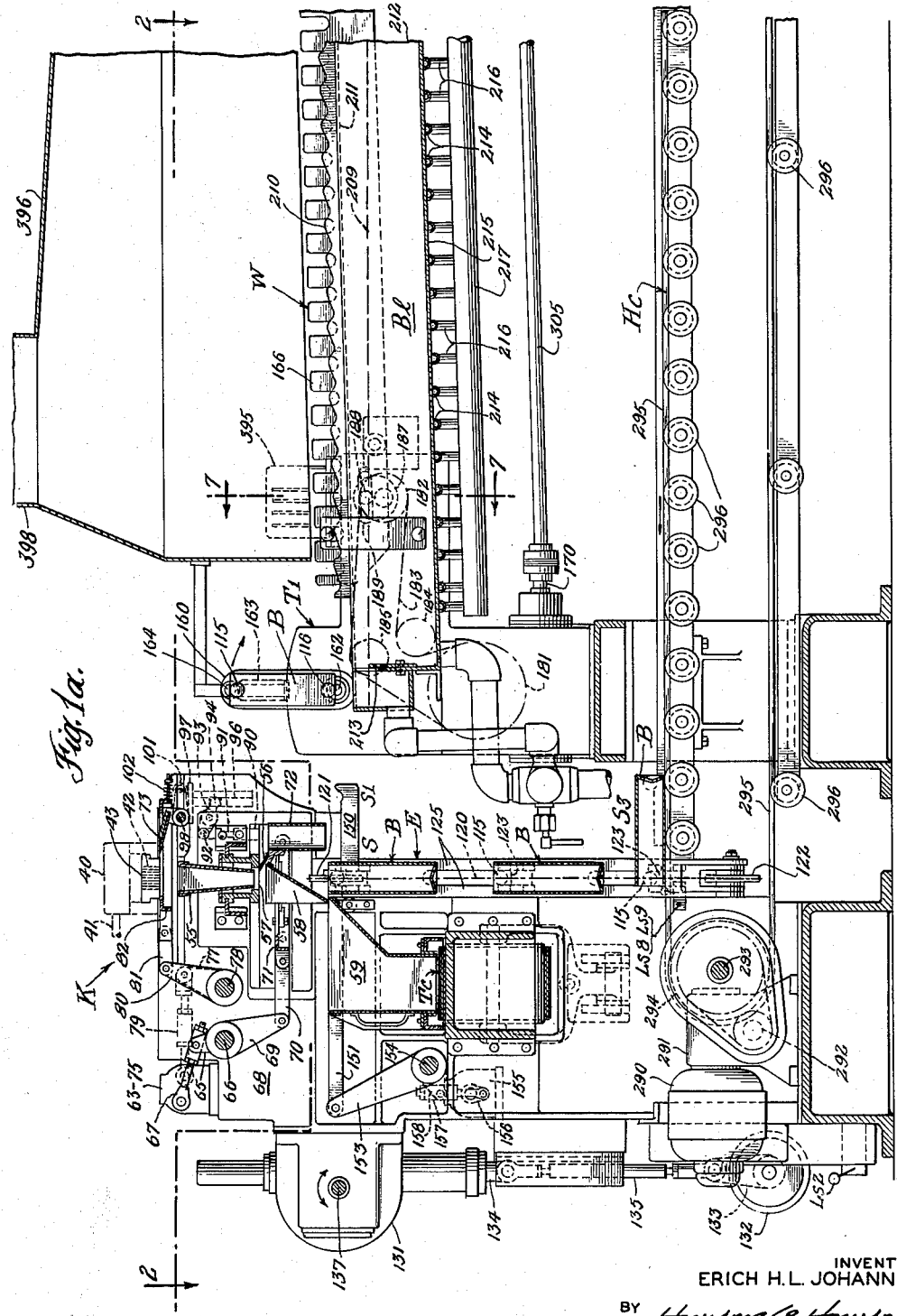

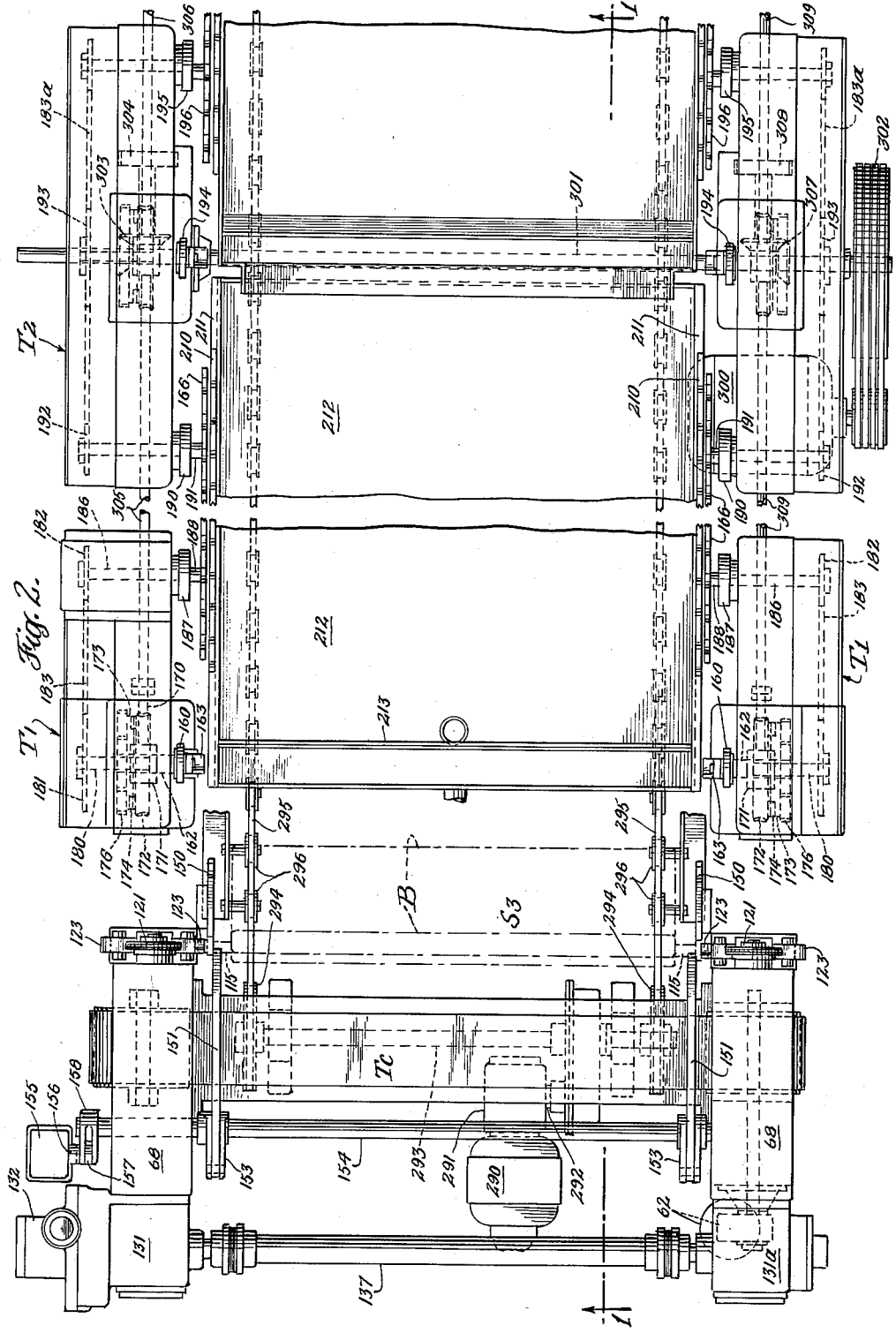

April 4, 1961    E. H. L. JOHANNES    2,977,902
APPARATUS FOR TRIMMING AND CUTTING
PREDETERMINED LENGTHS OF SPAGHETTI
Filed May 16, 1957    19 Sheets-Sheet 4

INVENTOR:
ERICH H.L. JOHANNES
BY Howson & Howson
ATTYS.

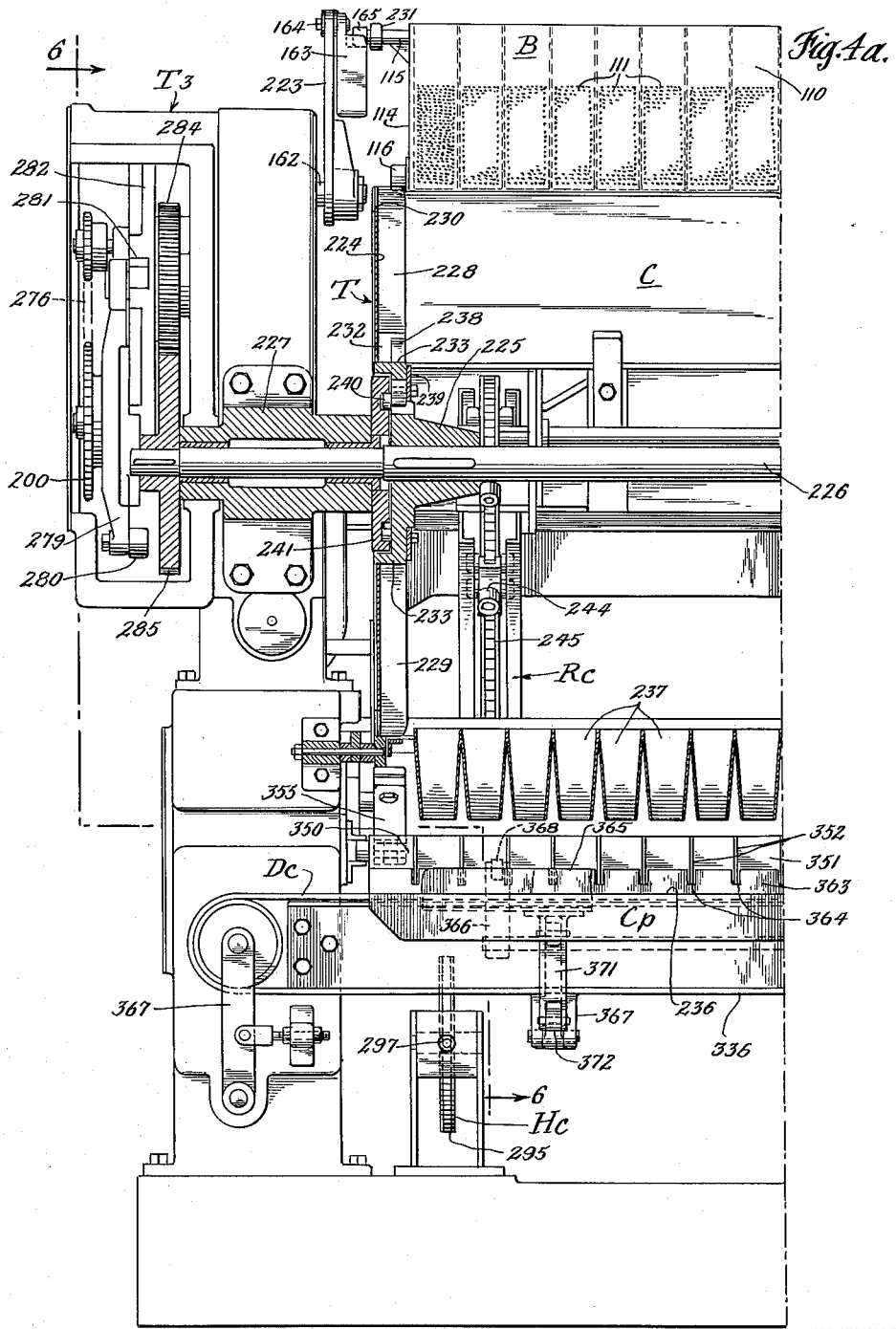

INVENTOR:
ERICH H. L. JOHANNES
BY Howson & Howson
ATTYS.

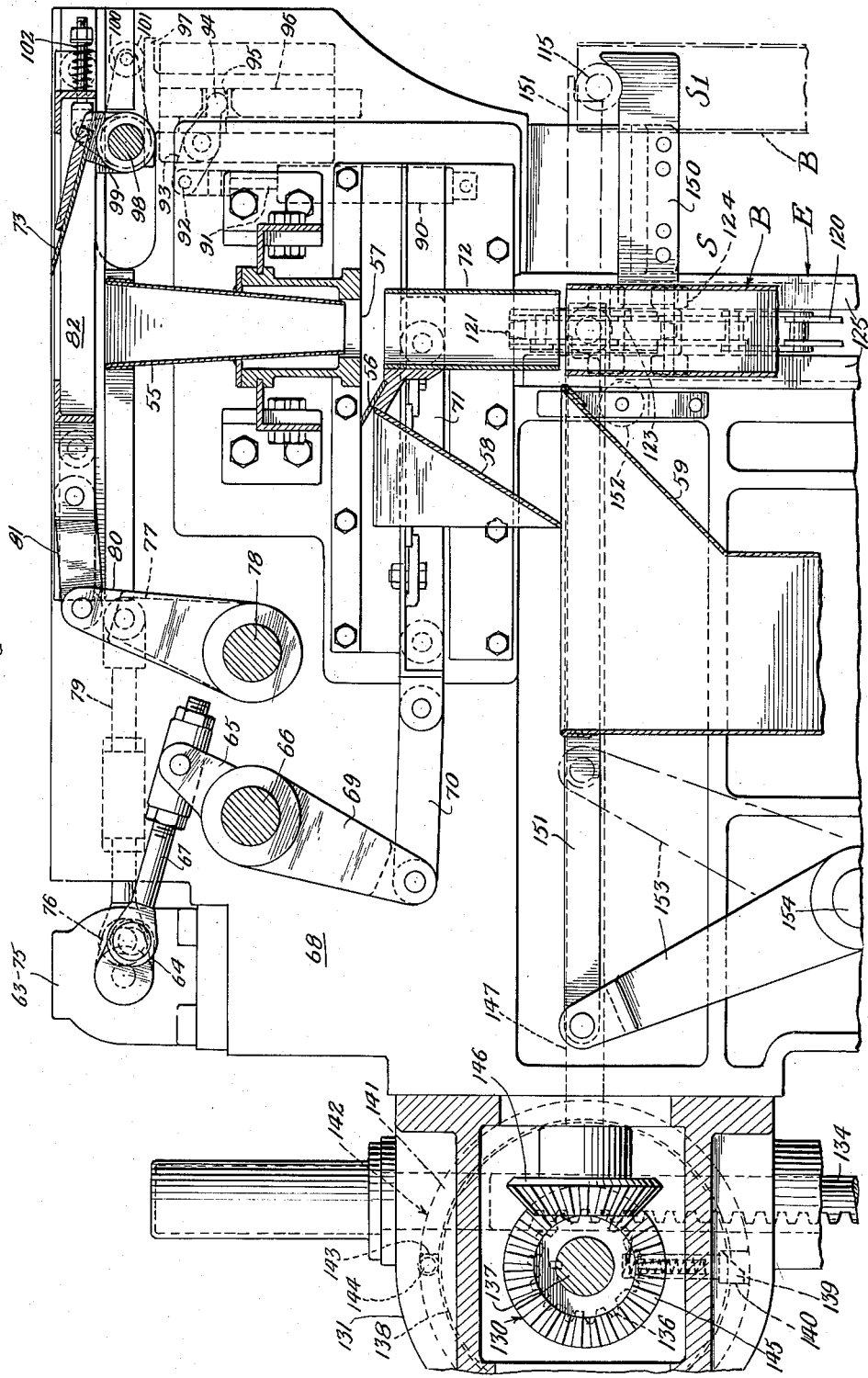

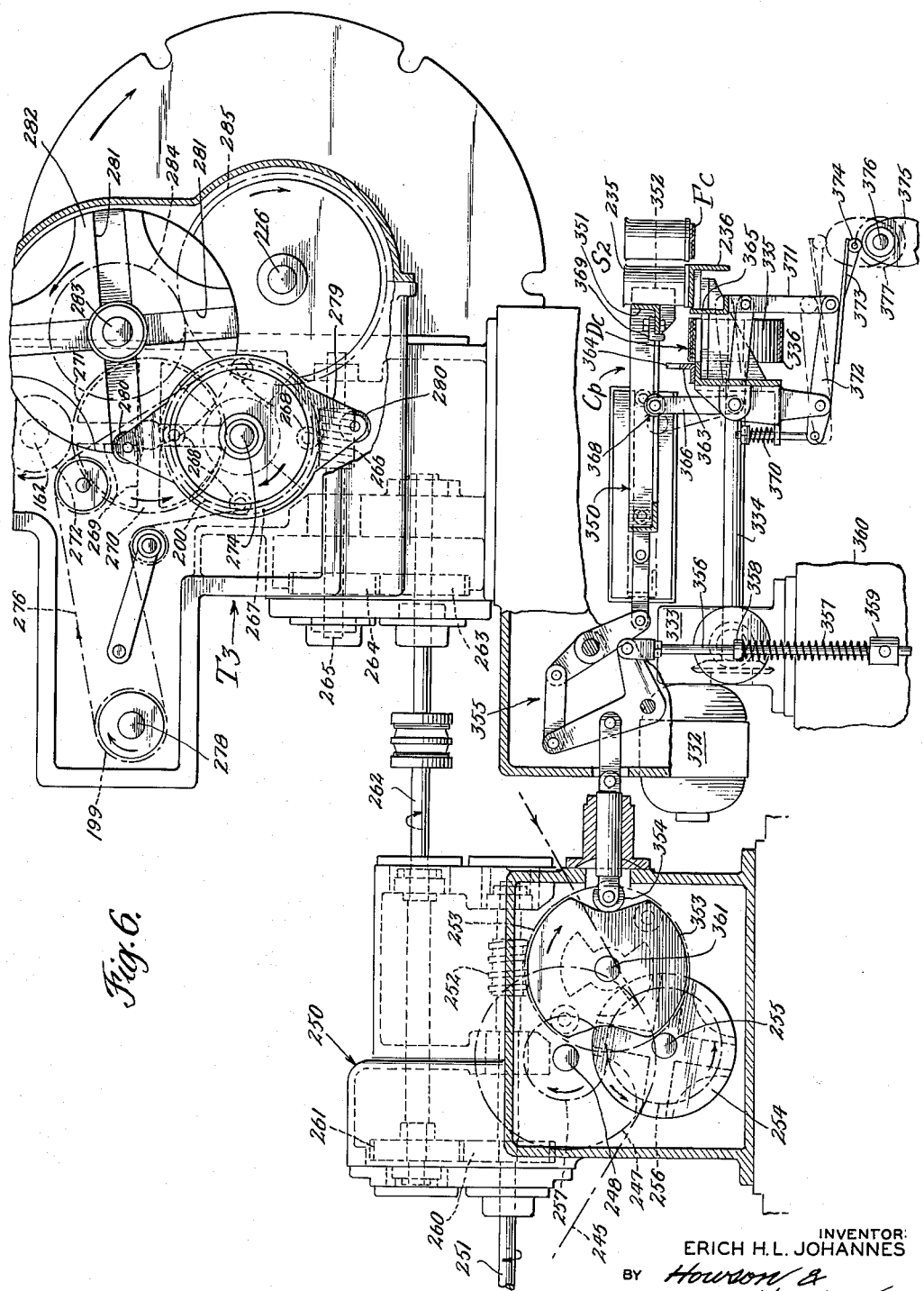

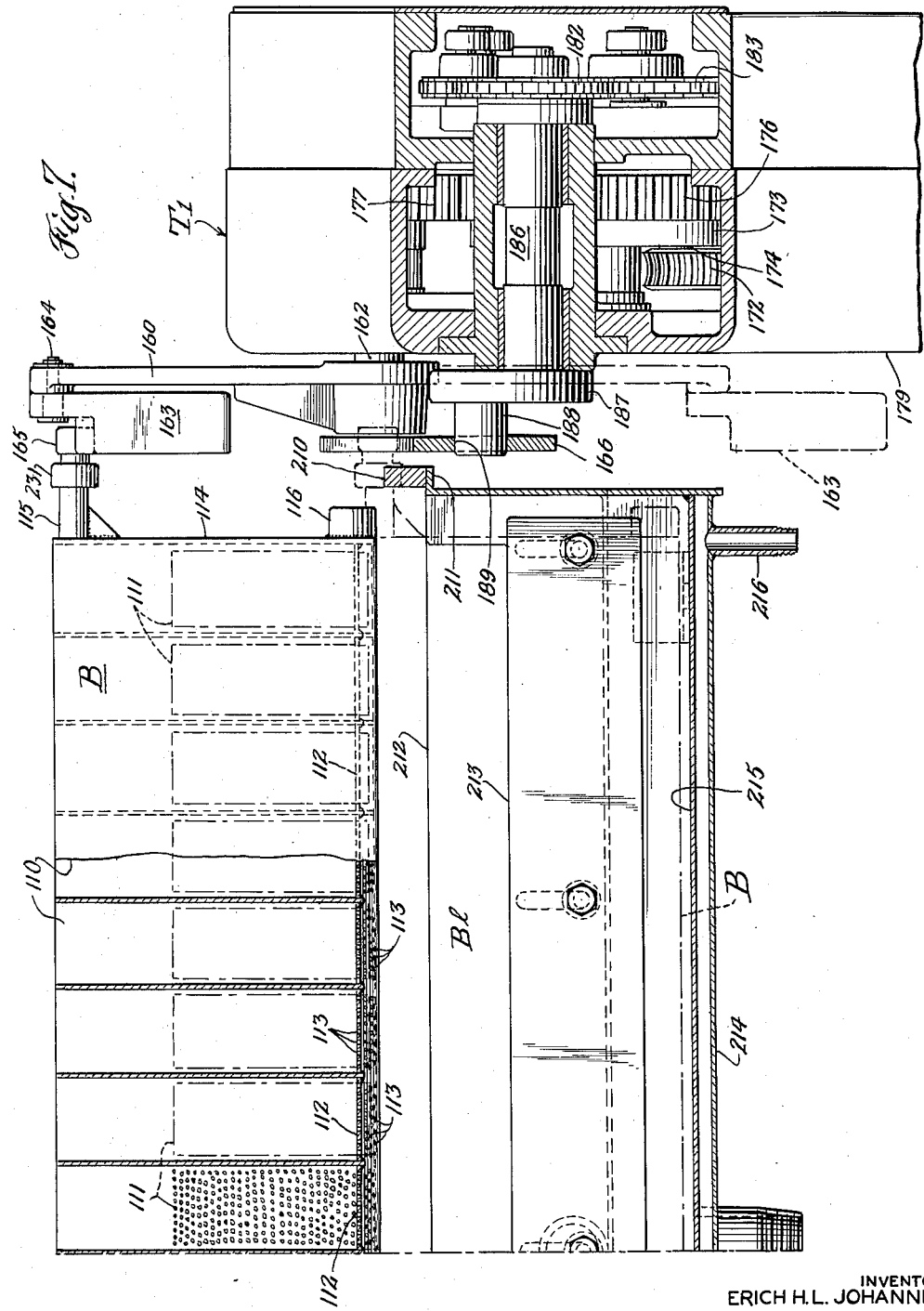

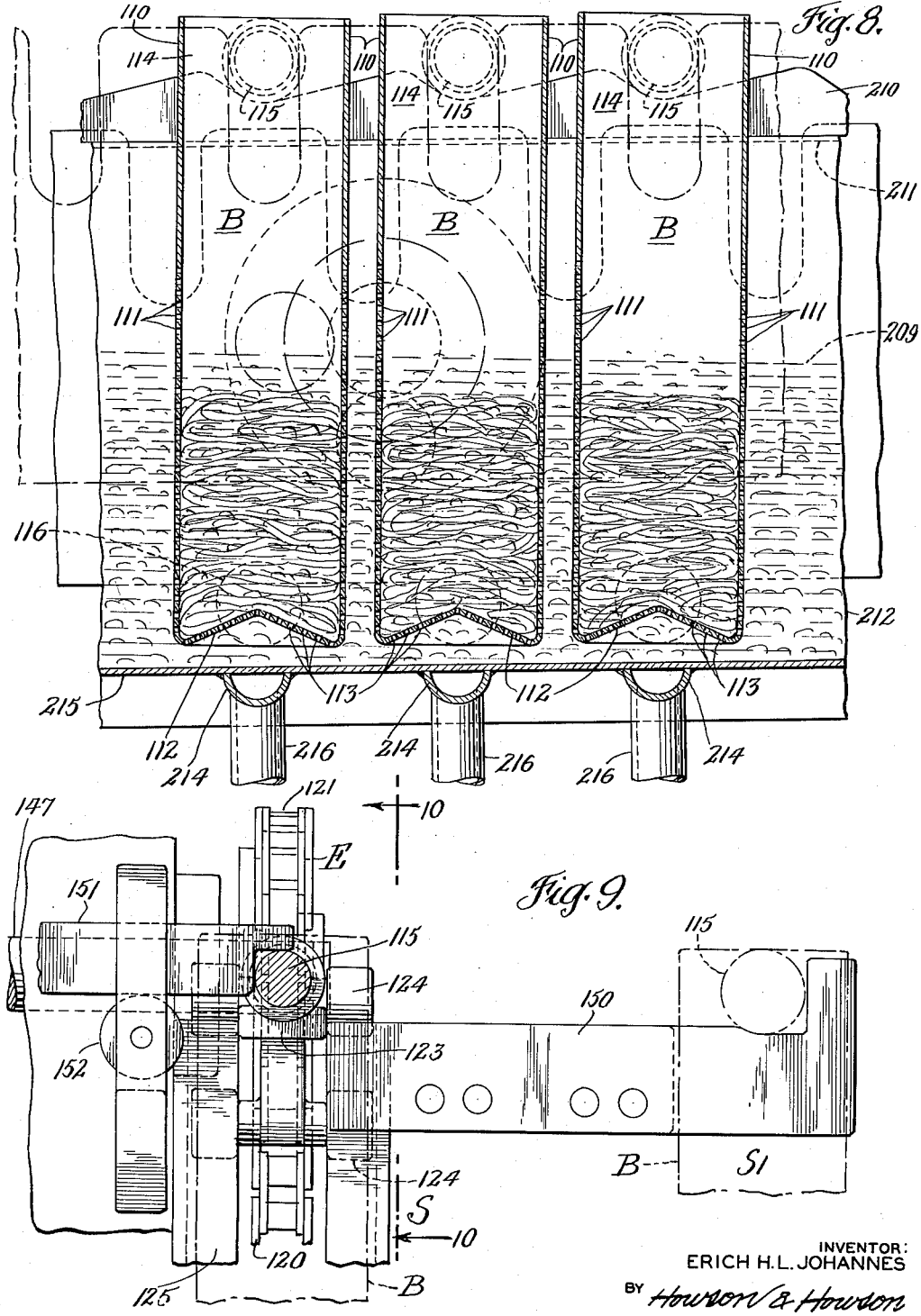

April 4, 1961
E. H. L. JOHANNES
2,977,902
APPARATUS FOR TRIMMING AND CUTTING PREDETERMINED LENGTHS OF SPAGHETTI
Filed May 16, 1957
19 Sheets-Sheet 11
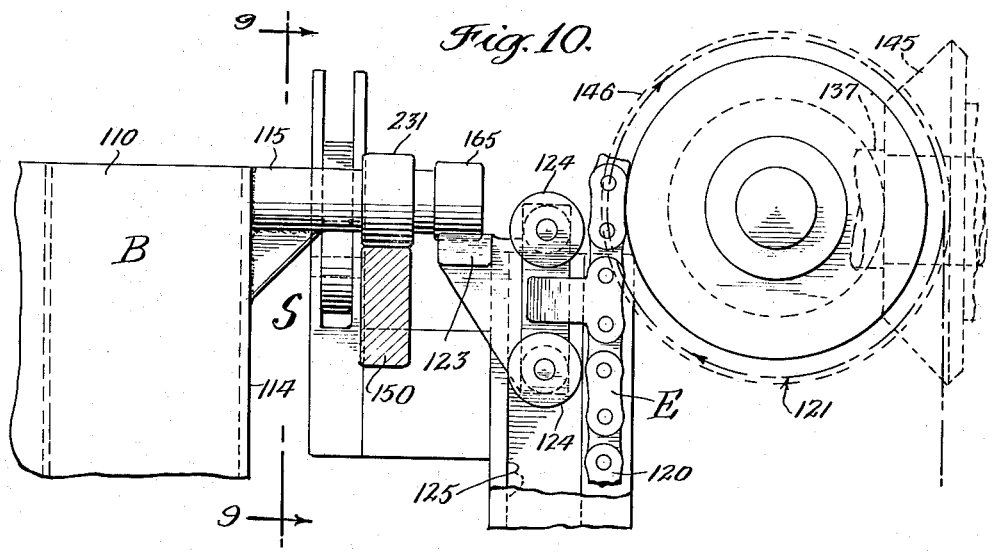
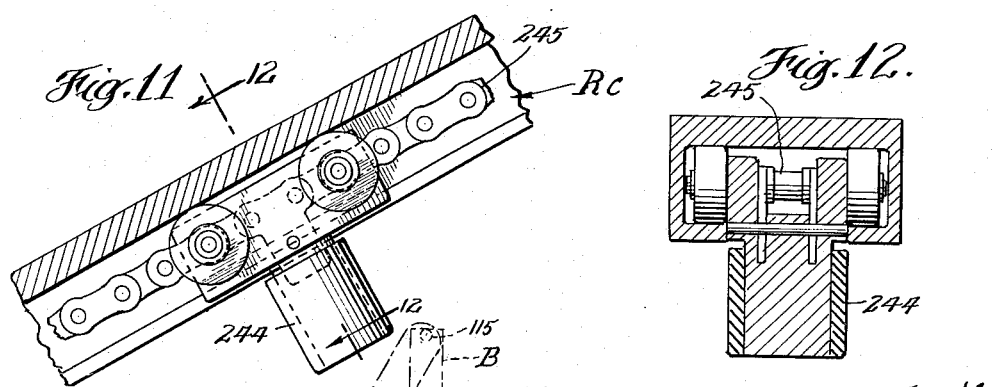
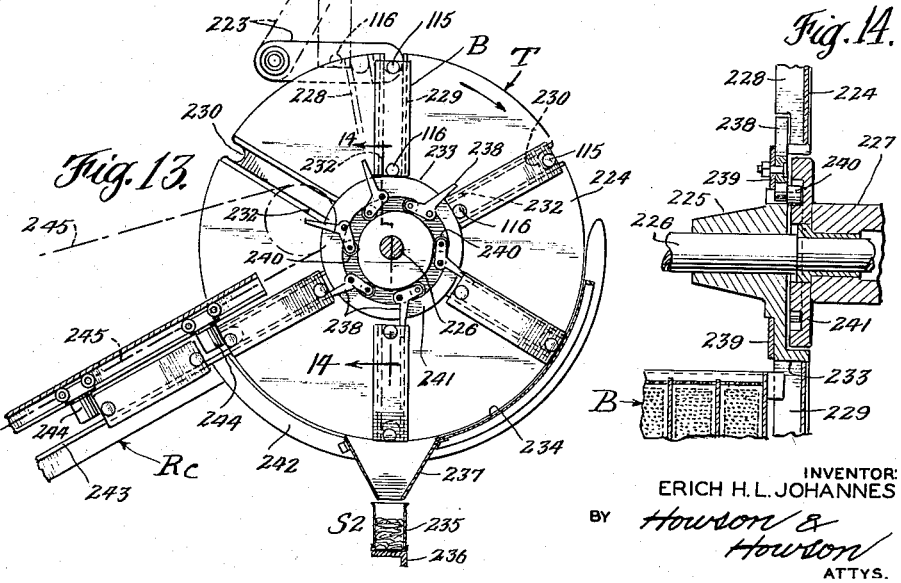
INVENTOR:
ERICH H. L. JOHANNES
BY Howson & Howson
ATTYS.

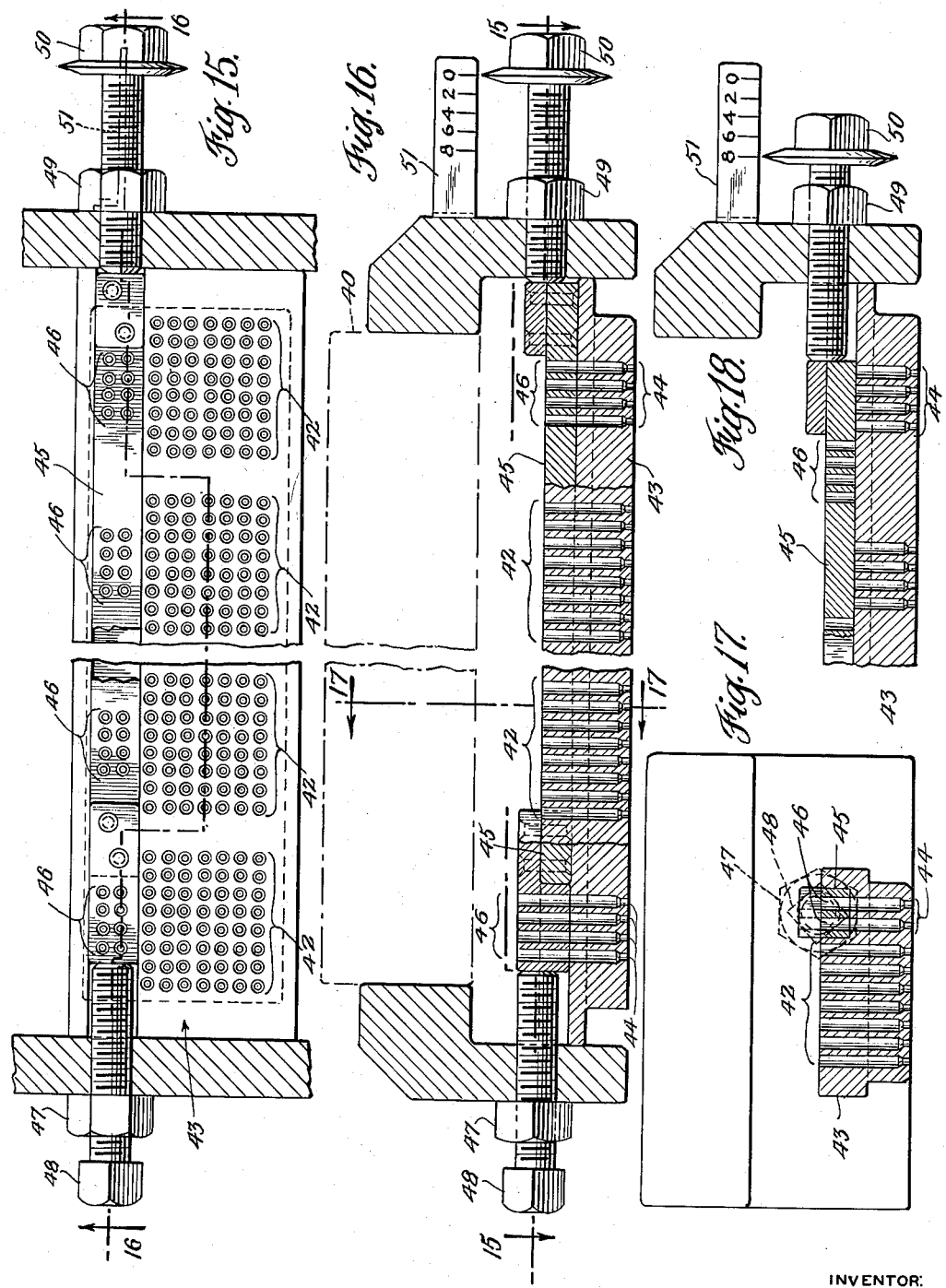

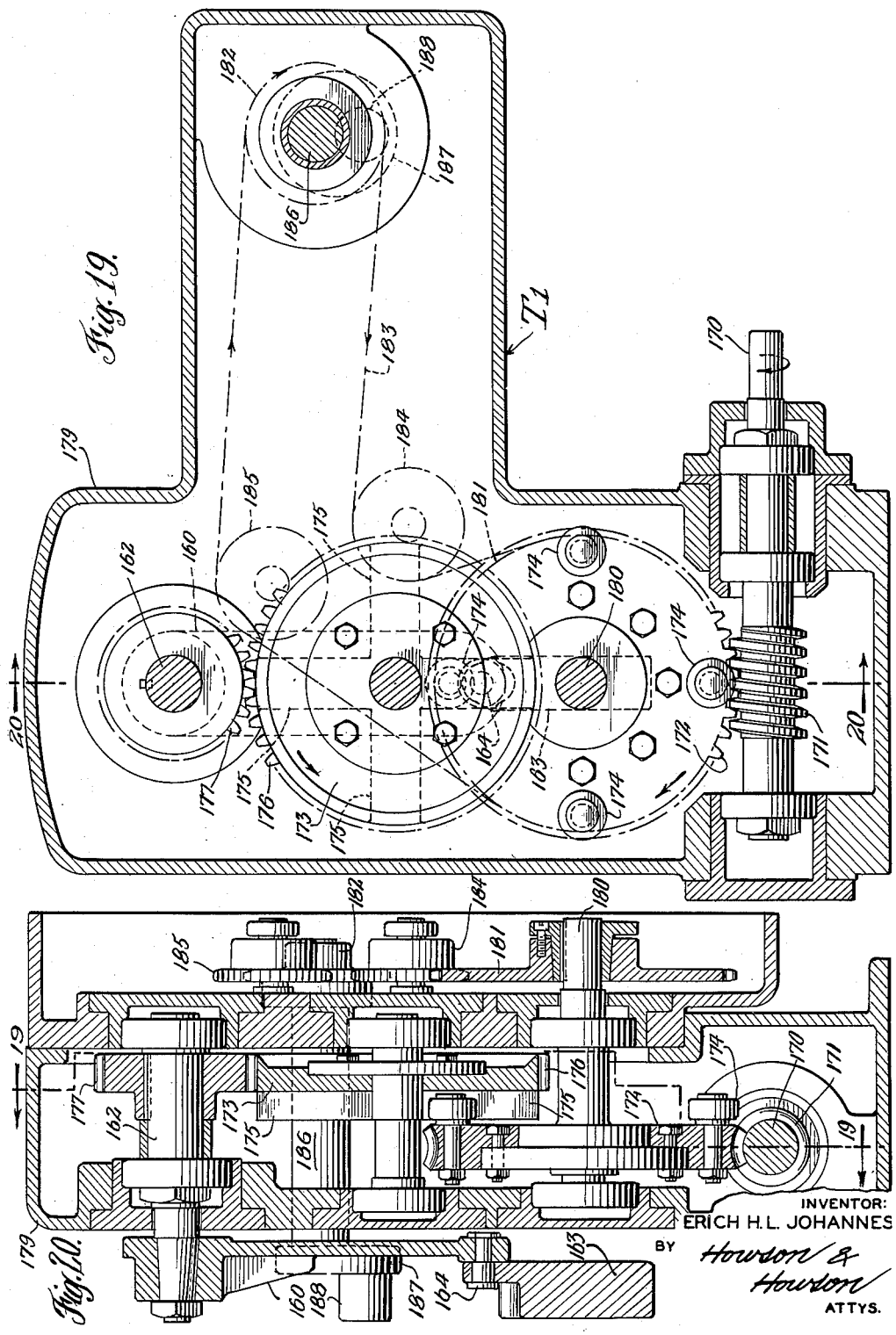

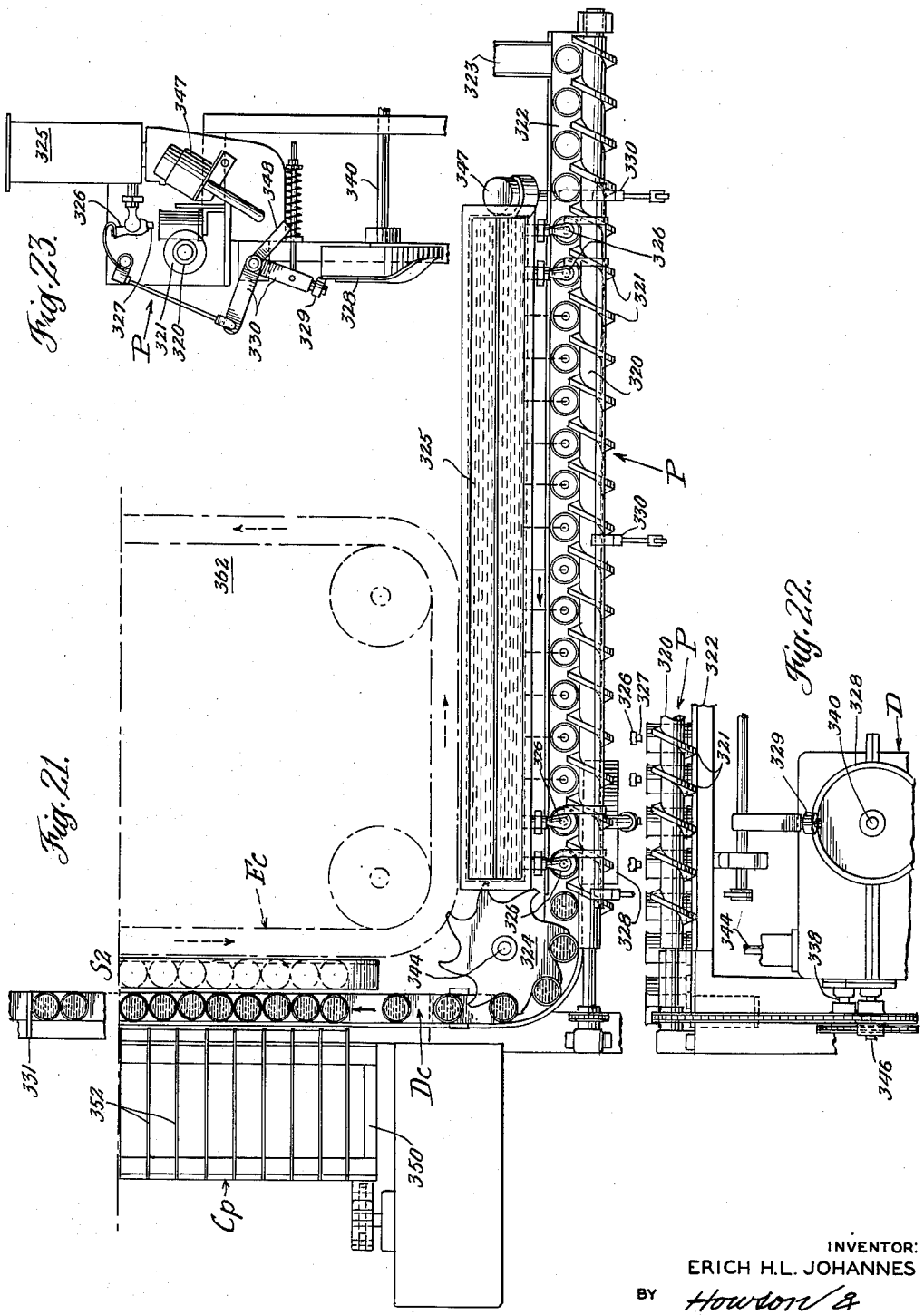

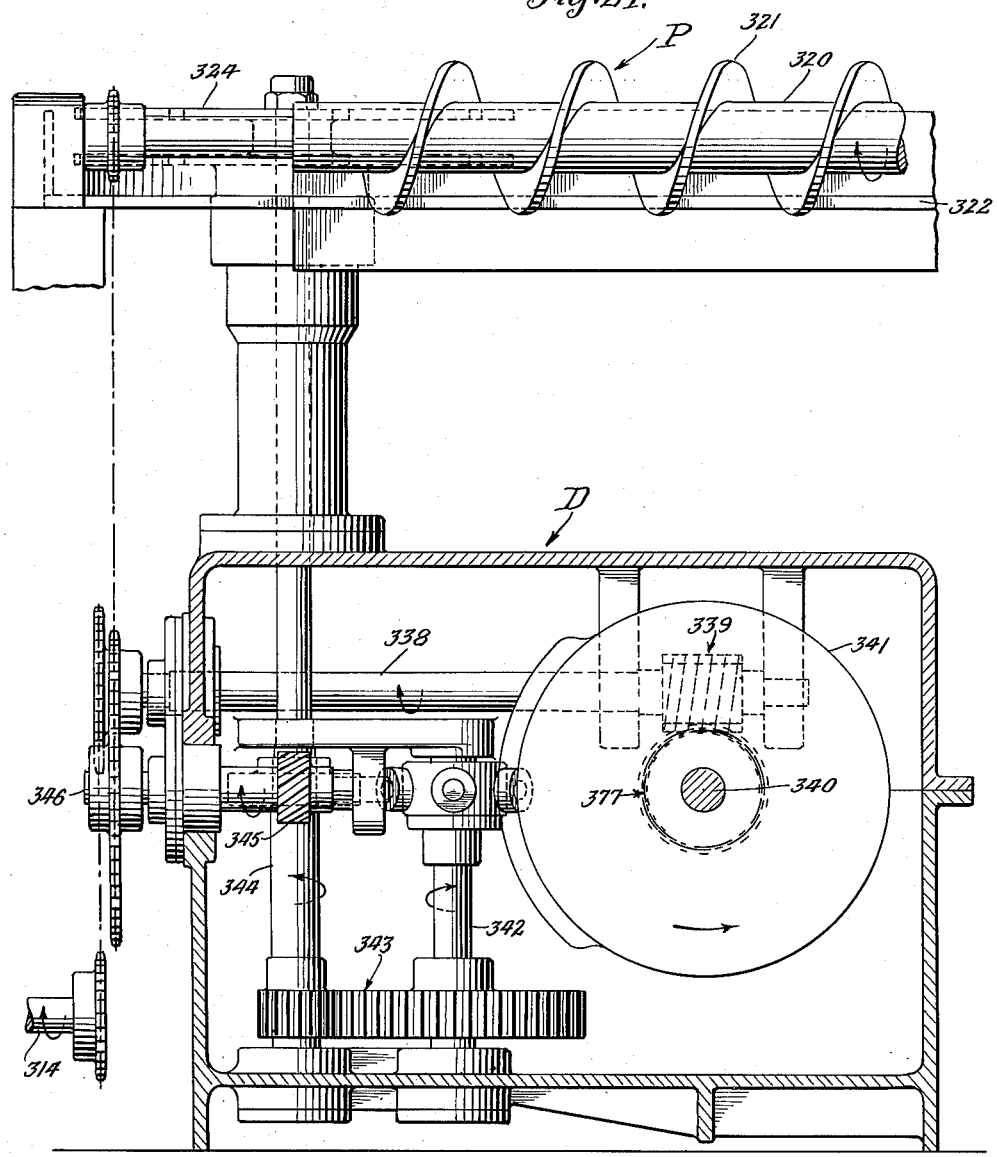

April 4, 1961  E. H. L. JOHANNES  2,977,902
APPARATUS FOR TRIMMING AND CUTTING
PREDETERMINED LENGTHS OF SPAGHETTI
Filed May 16, 1957  19 Sheets-Sheet 16
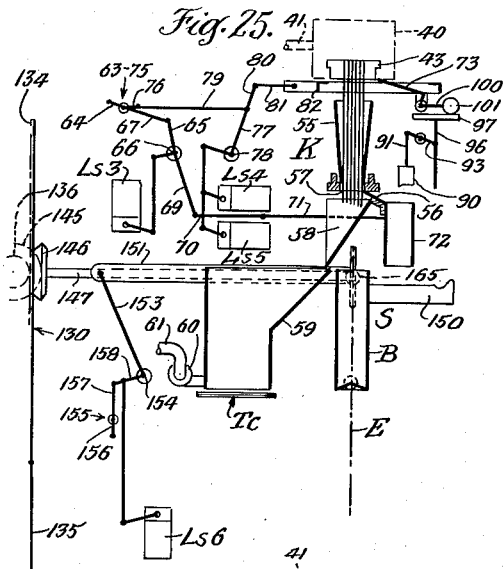
INVENTOR:
ERICH H.L. JOHANNES
BY Howson & Howson
ATTYS.

April 4, 1961
E. H. L. JOHANNES
2,977,902
APPARATUS FOR TRIMMING AND CUTTING
PREDETERMINED LENGTHS OF SPAGHETTI
Filed May 16, 1957
19 Sheets-Sheet 17
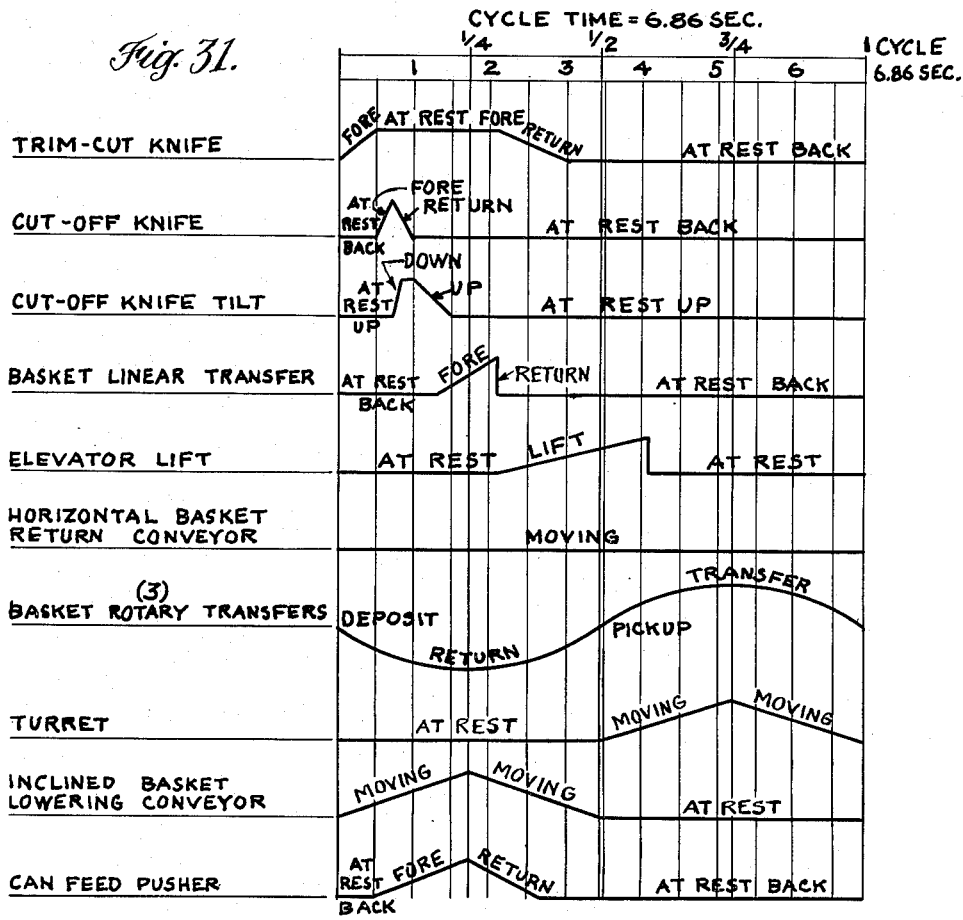
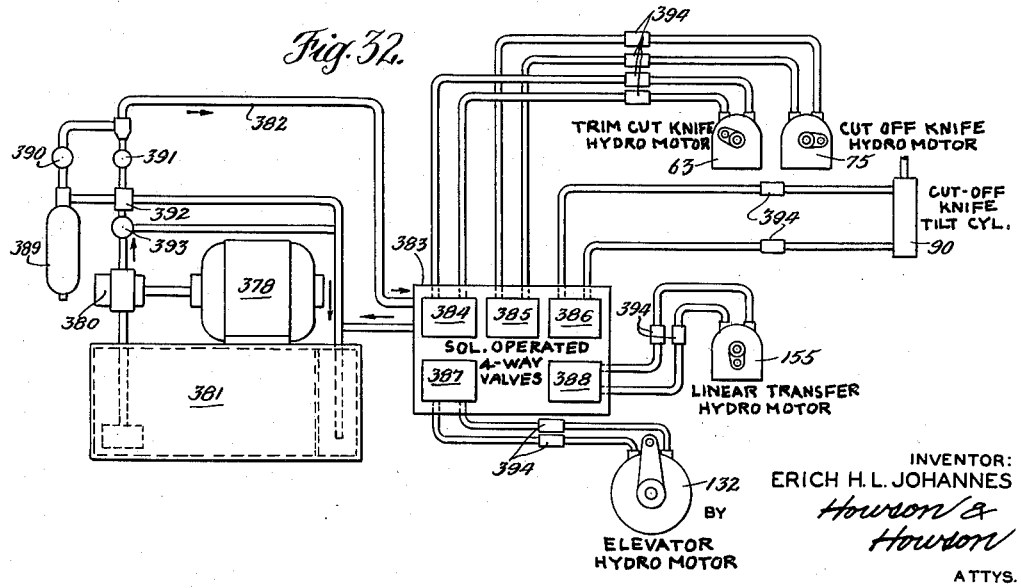
INVENTOR:
ERICH H. L. JOHANNES
BY Howson & Howson
ATTYS.

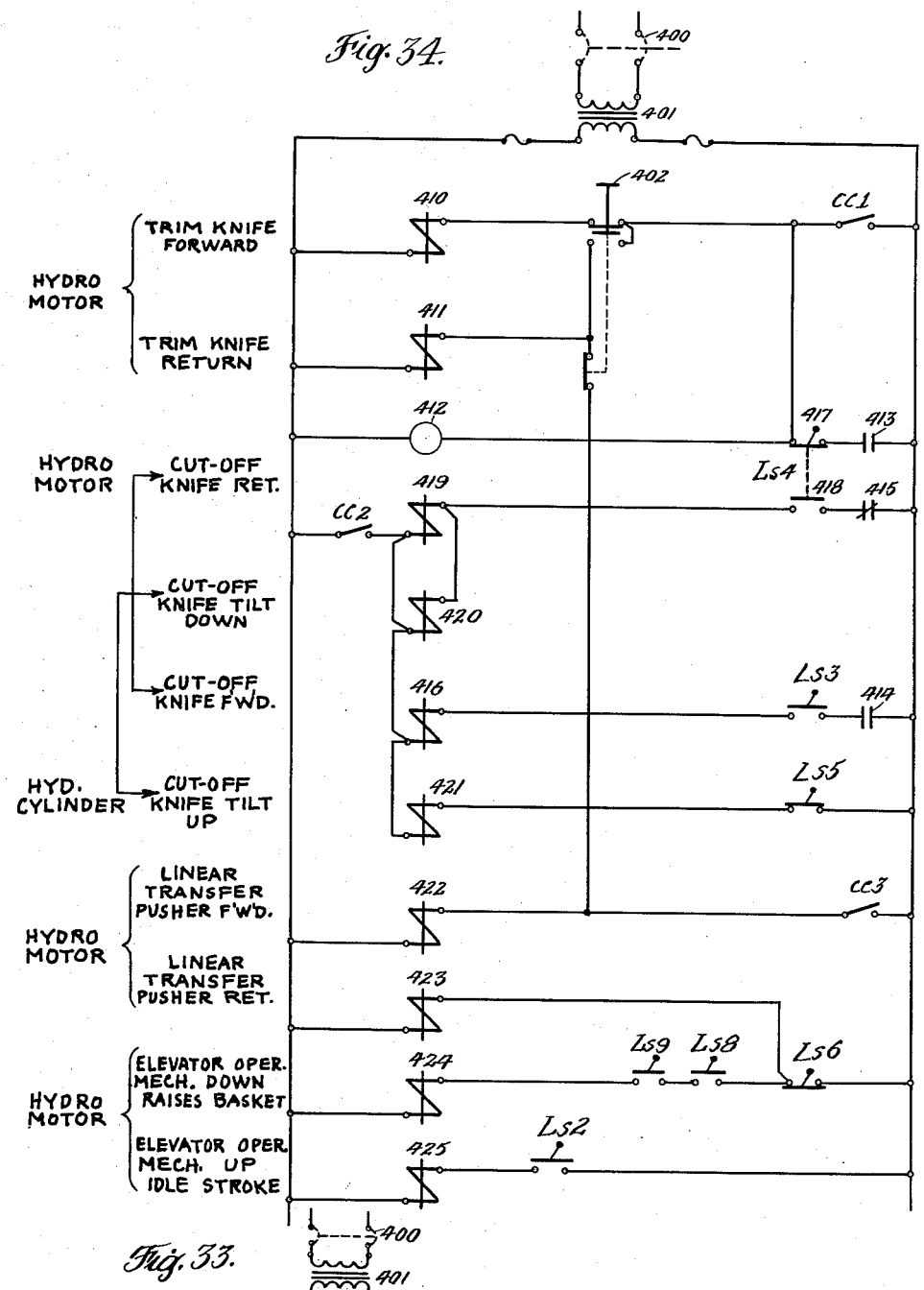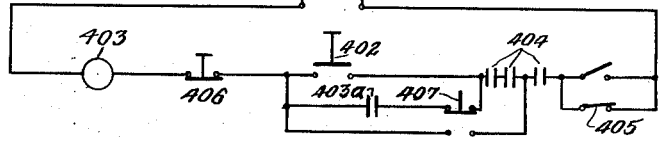

United States Patent Office 2,977,902
Patented Apr. 4, 1961

2,977,902

APPARATUS FOR TRIMMING AND CUTTING PREDETERMINED LENGTHS OF SPAGHETTI

Erich H. L. Johannes, Audubon, N.J., assignor to Campbell Soup Company, Camden, N.J., a corporation of New Jersey Filed May 16, 1957, Ser. No. 659,638

5 Claims. (Cl. 107—69)

This invention relates to spaghetti forming and canning machines and more particularly to a machine adapted to form spaghetti dough into strands of spaghetti of predetermined length and number, to handle the strand lengths of spaghetti in progress through spaghetti treating sections of the machine, such as blanching and cooling sections, to deliver the treated spaghetti into cans, preferably containing sauce, and to deliver the filled cans away from the machine for subsequent application of lids to the cans.

The machine embodied in the present disclosure includes a number of important, accurately timed cooperating mechanisms or units whereby continuous automatic operation of the machine is effected. These will now be generally described.

The dough is extruded through a die unit to form strands of spaghetti and then a knife mechanism or unit trims off the uneven ends of the strands and the trimmings drop through chutes to a conveyor for conveying them away. Next the extruded trimmed lengths are cut off and then drop into a basket carried by an elevator unit and the basket is then transferred by a transfer unit to a blanching unit where it is conveyed step by step along the length of the blanching unit to a second transfer unit which transfers the basket of blanched spaghetti to a cooling unit. The basket is then conveyed step by step along the length of the cooling unit to a third transfer unit which transfers the baskets of cooled spaghetti to a turret unit. The turret of the turret unit is rotated in step by step movement and the baskets are inverted by the turret so that their contents are emptied into waiting cans located below the turret. These cans before being positioned in readiness to receive the spaghetti first receive sauce from a pre-saucer unit and after receiving the spaghetti they are conveyed away from the machine to an adjacent station for subsequent application of lids to the cans.

Each basket is divided into a plurality of compartments crosswise of the machine and the die is arranged to extrude the spaghetti in spaced groups, one for each compartment of the basket. The cans at the turret are positioned in spaced relation, crosswise of the machine, corresponding to the spacing of the basket compartments so that the contents of each compartment is delivered into a registering can.

In the operation of the machine one basket after the other is brought into position by the elevator unit to receive its charge of spaghetti and then they pass through the above cycle of operations one after the other to finally deliver the spaghetti into the pre-sauced cans which are successively brought into registering position with the successive baskets. The empty baskets are delivered from the turret onto a return conveyor which delivers them to the elevator unit at the spaghetti loading end of the machine. The elevator unit picks up the returning baskets and positions them one after the other into spaghetti receiving position and then the above cycle is repeated in continuous operation.

Due to the automatic nature of the machine and because of the necessary timing of the units various switches and controls are employed, as will be apparent hereinafter.

A primary object of the invention is the provision of a spaghetti machine of the above character in which spaghetti is formed in groups of strands, cut off into strands of predetermined length, conveyed along for blanching and cooling treatment, and deposited in cans after treatment, all in continuous operation.

A further object of the invention is the provision of a spaghetti machine of the character described employing knife mechanisms for evenly trimming strands of spaghetti being continuously extruded through dies and for cutting the trimmed strands into predetermined lengths for delivery into cans.

A further object of the invention is the provision of elevator mechanisms for elevating baskets, one after the other, into position for receiving a predetermined quantity of spaghetti and transfer mechanisms for transferring the baskets one after the other to a spaghetti treating unit.

A further object of the invention is the provision of mechanisms for imparting step by step movement to the baskets containing spaghetti along the length of a spaghetti treating unit for effective treatment of the spaghetti.

A further object of the invention is the provision of a spaghetti machine of the character described employing baskets containing measured quantities of spaghetti, a spaghetti blanching unit, a spaghetti cooling unit, means for advancing the baskets through the blanching unit in step by step movement, means for transferring the baskets from the blanching unit to the cooling unit and means for advancing the baskets through the cooling unit in a step by step movement.

A further object of the invention is the provision of a spaghetti machine of the character described employing a turret for receiving baskets containing measured quantities of spaghetti which is adapted to invert the baskets to empty their contents into registering cans.

A further object of the invention is the provision of a spaghetti machine of the character described employing a plurality of basket transfer units and a common drive mechanism for the transfer unit.

A further object of the invention resides in the employment of hydromotor driven ratchet mechanisms for actuating the basket elevator in step by step movement.

Other objects of the invention have to do with the employment of hydromotor operation of the trim knife, the cut off knife, the elevator and the linear transfer for moving baskets away from the elevator.

A further object of the invention is to provide suitable controls for the various units of a machine of the character described.

A further object of the invention is to provide effective walking beam mechanism for advancing the baskets step by step along the spaghetti treating units of the machine.

A further object of the invention is the provision in a machine of the character described of a basket return conveyor employing means for self-righting the baskets for proper return travel to the basket elevator.

Further objects will be apparent from the specification and drawings wherein:

Figures 1a and 1b taken together, illustrate a longitudinal vertical section of the machine, the section being taken substantially as indicated by the line 1—1 of Figure 2;

Figure 2 is a plan view of Figure 1a and of a portion of Figure 1b, part of the view being broken away to condense the figure, and the view being taken as indicated by the line 2—2 of Figure 1a;

Figure 3:
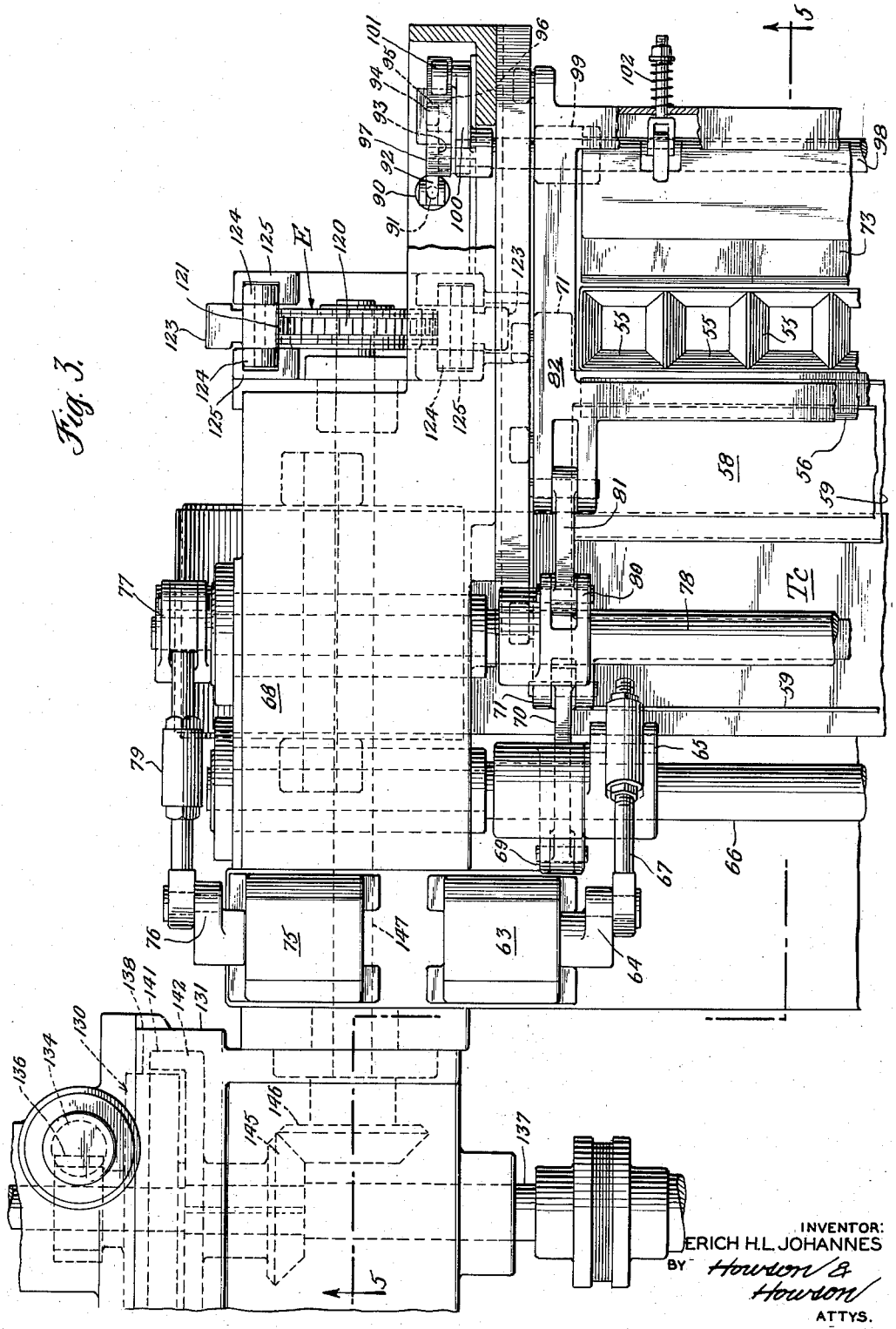
Figure 3 is an enlarged view of a portion of the plan view of Figure 2.
Figure 4B:
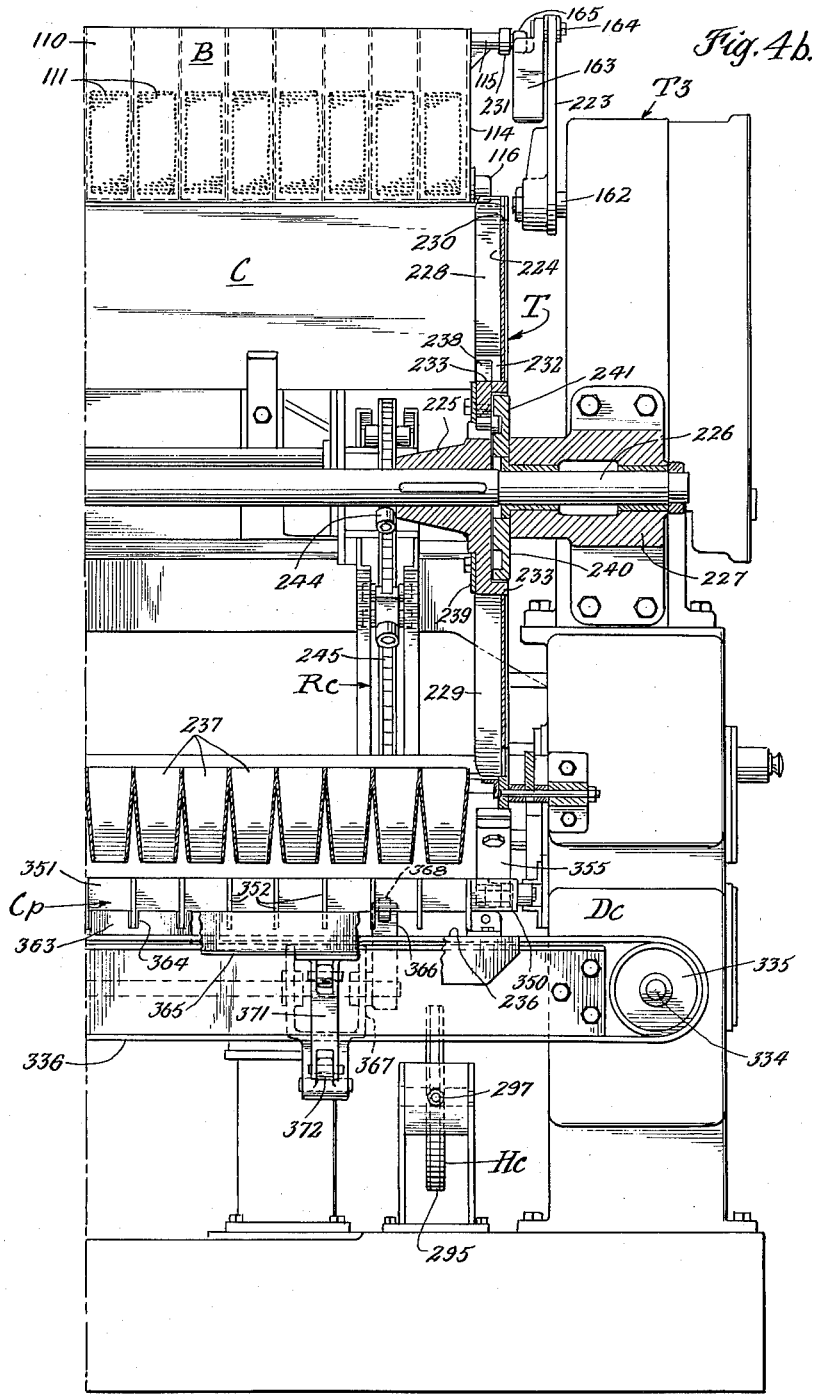

Figures 4a and 4b taken together illustrate a vertical cross section taken substantially on the line 4—4 of Figure 1b;

Figure 5 is an enlarged vertical section taken on the line 5—5 of Figure 3;

Figure 6 is a fragmentary irregular vertical section taken substantially on the line 6—6 of Figure 4a with the can pusher mechanism shown in advanced position;

Figure 7 is an enlarged one-half cross section taken on the line 7—7 of Figure 1a;

Figure 8 is an enlarged longitudinal vertical section of a portion of the blanching tank and baskets;

Figure 9 is an enlarged fragmentary detailed view of elevator mechanism employed in the machine, the view being taken as indicated by the line 9—9 of Figure 10;

Figure 10 is a face view of Figure 9 taken as indicated by the line 10—10 of that figure;

Figure 11 is a detailed side view of a basket conveyor or pusher employed in the machine;

Figure 12 is a cross section taken on the line 12—12 of Figure 11;

Figure 13 is a face view of a turret employed for effecting discharge of the contents of the baskets.

Figure 14 is a cross section taken on the line 14—14 of Figure 13;

Figure 15 is a broken out plan section of a dye employed to form groups of spaghetti, the section being taken on the line 15—15 of Figure 16;

Figure 16 is a section taken on the line 16—16 of Figure 15.

Figure 17 is a cross section taken on the line 17—17 of Figure 16;

Figure 18 is a fragmentary section similar to Figure 16, but showing a different adjusted position of the die;

Figure 19 is a vertical section taken on the line 19—19 of Figure 20 of a transfer unit employed in the machine;

Figure 20 is a cross section taken on the line 20—20 of Figure 19 and with the chain drive which appears in front of the plane of the section being shown in dot and dash lines;

Figure 21 is a plan view of a pre-saucer device employed in the machine;

Figure 22 is a partial front elevational view of Figure 21;

Figure 23 is an end elevation looking toward the left in Figures 21 and 22;

Figure 24 is an enlarged sectional elevational view of drive mechanism associated with the pre-saucer device of Figures 21, 22 and 23.

Figures 25-30 are schematic views showing progressive positions of knife mechanisms and associated parts;

Figure 31 is a timing or cycle diagram;

Figure 32 is a hydraulic diagram; and

Figures 33 and 34 are schematic diagrams of certain control circuits.

Figure 35:
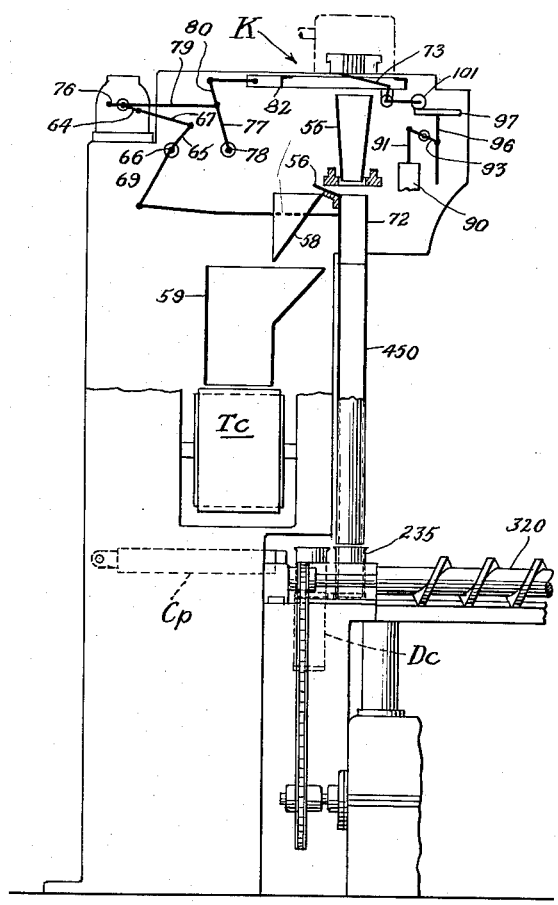

Fig. 35 is a diagrammatic view of a portion of the apparatus showing, in particular, the cut-off and chute sections thereof delivering cut-off strands of spaghetti into cans.

Referring now particularly to Figures 1a, 1b, and 2 the machine of the present invention is associated with well known dough mixing and extruding mechanism from which the dough is led to a suitable die chamber 40 by a tube or tubes 41, as indicated in broken lines in Figure 1a, so as to force the dough through a plurality of holes 42 in the die 43 to form strands of spaghetti.

The present machine in general comprises the die 43, a trim knife and cut-off knife unit K, a transverse trimmings conveyor Tc, a basket elevator E, a plurality of baskets B, a blanching unit Bl for treating the spaghetti, a cooling unit C for cooling the spaghetti, a turret unit T to which baskets are transferred from the cooling unit C, an inclined basket lowering conveyor Rc, a horizontal basket return conveyor Hc, a pre-saucer unit P (Figures 21-24), a can delivery conveyor Dc, a filled can discharge conveyor Fc, and a can pusher device Cp.

The die 43 (Figures 15-18) is provided with a plurality of groups of die holes 42, each group consisting of the number of holes required to produce a predetermined number of strands of spaghetti to be packed in a can. In this instance sixteen groups of holes are employed in the die because the particular machine illustrated is designed to fill sixteen cans of spaghetti in each cycle of the machine.

In addition to the die holes 42 each group of holes has a small group of die holes 44 adjacent thereto, in this instance eight holes being shown in each of these small groups, with which an adjustable key 45 having similar groups of holes 46 is associated. The purpose of this arrangement is to enable extra strands of spaghetti to be added to or substracted from each group of strands being extruded through the die.

By referring to Figures 16 and 17 it will be seen that the key 45 has been adjusted so that all of the holes 46 are in registry with all of the holes 44 thus eight extra strands of spaghetti will be included with the strands of each main group.

In Figure 18 the key is shown adjusted to a position in which the eight holes 44 in the die are blanked off by the key 45 so that no strands of spaghetti will be formed by the holes 44.

In order to adjust the key 45 the nut 47 of the lock screw 48 is loosened and the lock screw 48 is unscrewed. Then the nut 49 of the adjusting screw 50 is loosened and the adjusting screw is turned to its desired position of adjustment after which the lock screw is screwed up against the end of the key and locked in place by means of the nut 47. It will be noted that a fixed scale member 51 is associated with the adjusting screw and as shown in Figure 16 the pointer reads at zero indicating that no holes are blanked off. In Figure 18 the pointer reads at "eight" indicating that all eight holes are blanked off.

In operation one method of adjustment is to start with no holes blanked off as shown in Figures 16 and 17 and then as the holes of the die wear to larger diameter, due to continued use of the die with consequent increase in the weight of spaghetti extruded, the key can be adjusted to blank off holes to decrease the number of strands to be extruded to maintain the original weight.

Another method of adjustment is to start with four of the holes blanked off, thus enabling more holes to be blanked off with adjustment of the key in one direction or enabling more holes to be unblanked with adjustment in the other direction.

The extruded strands of spaghetti pass downwardly from the die through a plurality of funnels 55, in this instance sixteen transversely of the machine, to a point slightly past the lower end of the funnels, as indicated in Figure 25, and then the trim cut knife 56 moves across the opening 57 at the bottom of the funnels and trims all of the strands to even length, as indicated in Figure 26. In this connection it is pointed out that when these strands are extruded through the die they are not all of the same length, thus making this trimming operation necessary.

The trimmings thus cut off slide down a chute 58 which guides them into a second guiding chute 59 and onto the continuously moving transverse conveyor Tc, as indicated in Figure 26. The conveyor Tc conveys the trimmings out to the side of the machine from where they may be conveyed back to the dough supply vat as by means of a suction fan 60 and return line 61 indicated in Figure 26. The trimmings conveyor is suitably driven as by means of a motor and gear reduction unit 62, see Figure 2.

The trim cut knife 56 is actuated by means of a 180° movement hydromotor 63 (Figures 1a, 3 and 5) having a crank 64, connected to a lever 65 on a transverse rock shaft 66 by a link 67. The rock shaft 66 is suitably mounted in the side frame members 68 of the machine and carries a downwardly extending lever 69 adjacent each end for connection by links 70 to a carriage 71 on which the trim cut knife 56 is mounted. The trimmings chute 58 is also mounted on the carriage 71 as are also a plurality of strand chutes 72, one for each group of strands.

As clearly shown in Figure 5, when the trim cut knife is moved to its left hand position by the hydromotor the strand chutes 72 are brought into alignment with the funnels 55 in which the now trimmed strands of spaghetti are located and while they are in this position the cut off knife 73 is immediately moved across the bottom face of the die to cut off the strands of spaghetti. The cut-off strands then drop through the strand chutes 72 and into a waiting basket B which had been elevated to the spaghetti receiving station S by the basket elevator unit E. This position of the parts is diagrammatically shown in Figure 28.

Back and forth movement of the cut off knife 73 is accomplished by means of a 180° movement hydromotor 75 (Figure 3) having a crank 76 connected to a lever 77 on a transverse rock shaft 78 by a link 79. The rock shaft 78 is suitably mounted in the side frame members 68 of the machine and carries an upstanding lever 80 adjacent each end for connection by links 81 to a carriage 82 on which the cut-off knife 73 is mounted.

It is pointed out that although the knife actuation is rapid, nevertheless, while it is taking place, new strands of spaghetti are being formed by the die as diagrammatically shown in Figure 27 and therefore in order to prevent wiping these newly forming strands across the bottom face of the die on the return movement of the cut-off knife, mechanism is employed to immediately tilt the cut-off knife downwardly at the end of its cut-off stroke so as to clear the forming strands in its return stroke.

Referring to Figures 1a, 3 and 5 this mechanism comprises a hydraulic cylinder 90 having its piston rod 91 connected to one end 92 of a pivotally mounted lever 93. The other end 94 of the lever 93 operates in a groove 95 in a vertical slide rod 96 which has a wide flat head portion 97. The cut-off knife 73 is pivotally mounted in the carriage 82 by means of a rock shaft 98 having bearings in the ears 99 of the carriage. Secured on the rock shaft 98 is an arm 100 carrying a roller 101 which rides on the upper flat surface of the slide rod head 97. The roller is maintained in contact with the head 97 by a spring 102.

It will be seen that when the slide rod 96 is held in the position shown in Figure 5 by the piston and cylinder 90 the cut-off knife is free to move in its cut-off stroke without tilting because the roller 101 rides on the flat surface of the slide rod head. However, immediately after the cut-off knife reaches the end of its cut-off stroke the cylinder is actuated to raise the slide rod and thus causes the knife to tilt downwardly. The return stroke of the knife takes place immediately after the knife has tilted down and the slide rod remains in raised position during the return stroke of the knife as diagrammatically shown in Figures 28 and 29, thus causing the knife to clear the strands of spaghetti being extruded from the die. After the knife has reached the end of its return stroke the cylinder is actuated to tilt the knife upwardly to its position of readiness to perform its next cutting off stroke.

Referring particularly to Figures 4a, 4b, 7 and 8 the baskets B above referred to extend crosswise of the machine and are divided into sixteen compartments each for receiving one of the sixteen groups of spaghetti strands which are cut off by the cut-off knives above described. The lower portions of the side walls 110 of the baskets are perforated as indicated at 111. The baskets have open tops and have inverted V-shaped bottoms 112, which are also perforated as indicated at 113.

At the top portion of the end walls 114 projecting studs 115 are provided which are engaged to convey the baskets in their progress through the machine and at the lower portion of the end walls shorter projecting studs 116 are provided. The function of the studs 115 and 116 will appear fully as the description of the progress of the baskets proceeds.

The basket elevator E for elevating baskets from the basket pick up station S53 of the horizontal basket return conveyor Hc to the spaghetti receiving station S comprises a vertically disposed chain 120 and sprockets 121 and 122 arranged at each side of the machine and having chain lugs 123 in which the projecting studs 115 of the baskets seat as the baskets are lifted upwardly by the elevator. The disposition of the elevator chains with the respect to the baskets is clearly shown in Figures 2, 9 and 10, as is also the construction of the chain lugs. It will be noted that the lugs are guided in their vertical runs by means of rollers 124 running in vertical guide tracks 125. In Figure 10 the end of the basket stud 115 is clearly shown seated in the chain lug 123.

In Figure 1a a horizontally disposed basket is shown on the horizontal basket return conveyor with the studs 115 thereof abutting the adjacent guide track of the elevator as a stop and with these studs 115 lying in the path of the elevator lugs 123. When the elevator moves upwardly, in its next step movement, the lugs 123 will lift this basket and move it to the vertical position of the next above basket. In the next step movement of the elevator the basket will be elevated to the position of the upper basket which is at the station S where it receives the spaghetti.

The mechanism for imparting step by step movement to the elevator E comprises a rack and pinion and ratchet device 130 housed in a housing 131 and actuated by a 180° hydromotor 132. The crank 133 of the hydromotor is connected to a vertically extending rack 134 by a connecting rod 135 to cause the rack to reciprocate up and down. The rack engages a pinion 136 which is rotatably mounted on a transverse shaft 137 (Figures 3 and 5). The pinion 136 is secured to a disc 138 which carries a spring urged pawl 139 adapted to engage in a notch 140 in the flange 141 of a ratchet wheel 142. Spaced 180° from the notch 140 is another notch 143 engageable by a spring indent or back lash pawl 144. The ratchet wheel is keyed on the transverse shaft 137 and has a bevel gear 145 secured thereto which meshes with a bevel gear 146 secured on a horizontally extending shaft 147 on which the drive sprocket 121 of the elevator chain 120 is secured. The transverse shaft 137 extends from the housing 131 at the rear of the machine to a similar housing 131a at the front of the machine in which similar mating bevel gears are located to drive the drive shaft of the drive sprocket 121 of the front elevator chain.

When the hydromotor rotates its crank 133 through 180° from its down position to the up position shown in Figure 1a the rack 134 rotates the pinion 136 and disc 138 to cause the pawl 139 to ride out of its notch while the back lash pawl 144 holds the shafts 137 and 147 against rotation in well known manner. Thus, in this upward stroke of the rack the basket elevator remains idle.

At the end of the upstroke of the rack the pawl 139 again engages in the notch 140 of the ratchet wheel 142 and when the direction of rotation of the pawl is reversed by the down stroke of the rack the pawl causes the shafts 137 and 147 to rotate thus driving the elevator chain in a direction of lift the waiting basket upwardly off the return conveyor and to position a basket at the ready spaghetti receiving station S.

After the ready basket has received its spaghetti at the receiving station S it is shifted in linear transfer from this station to the pick up station S1, as indicated in broken lines in Figures 5 and 9 where it is suspended from the fixed bars, 150, one at each side of the machine, by means of the basket studs 115.

This linear transfer of the basket is accomplished by means of a push bar 151 guided on a roller 152 and connected to a lever arm 153 secured on a transverse rack shaft 154. The lever arm 153 is oscillated by means of a 180° hydromotor 155 to the crank 156 of which it is connected by a link 157 and arm 158 secured on the rack shaft 154 (Figures 1a and 2). It will be seen from Figure 2 that there is a push bar 151 at each side of the machine for engaging the end studs 115 of the basket so as to give an even push to the basket.

This shifted basket at station S1 is now ready to be picked up and transferred by means of a rotary transfer unit T1 to a walking beam device W associated with the blanching tank B1.

The rotary transfer unit T1 includes a rotary transfer arm 160 secured on a shaft 162 and carrying at its free end a weighted basket seating member 163, which member is pivotally connected to the arm 160 for freedom of movement, as a pendulum, so to speak, by means of a pivot pin 164. Thus, as the arm rotates the member 163 will remain in suspended vertical position.

By referring particularly to Figures 4a, 4b, and 7 it will be seen that enlarged portions 165 of the basket studs 115 seat in the pivoted seating members 163 of the transfer arms 160 and are thus suspended from the arms, in vertical position, during the rotary transfer movement of the arms.

In Figure 1a the arm 160 is shown carrying a basket B, which it had picked up from the fixed bars 150 in its rotary transfer movement and which is to be deposited in the first notch of the movable beam 166 of the walking beam device W for subsequent movement step by step along the length of the blanching tank B1, as will further appear.

The transfer unit T1 (Figures 1a, 19 and 20) comprises a drive shaft 170 having a drive worm 171 for driving a worm wheel 172. The worm wheel actuates a Geneva wheel 173 by means of four driving rollers 174 mounted on the worm wheel in 90° spacing and engaging four radial slots 175 in the driven Geneva wheel 173 to rotate it. The Geneva wheel 173 carries spur teeth 176 meshing with and driving a spur gear 177 keyed on the shaft 162 which extends outwardly through the housing 179 and carries the transfer arm 160.

The ratio of the spur gear 177 to the spur gear 176 is two to one, thus for each one quarter revolution of the Geneva wheel 173 the transfer arm 160 is rotated one half revolution. In one half revolution of the arm 160 it picks up a basket from the spaghetti receiving station S and deposits it in the walking beam device W of the blanching unit. In the other half revolution the arm 160 returns to pick up the next basket.

Keyed on the worm wheel shaft 180 is a sprocket wheel 181 drivingly connected to a sprocket wheel 182 by a chain 183. The chain passes over suitable guide sprockets 184 and 185. The sprocket 182 is keyed on a cross shaft 186 which extends outwardly through the housing 179 and carries a crank 187 on its projecting end. The crank 187 has a crank pin 188 which operates in a longitudinal slot 189 (Figure 1a) provided in the movable beam 166 of the walking beam device W. As the crank rotates up and down motion is transmitted to the movable beam 166. It will be seen from the foregoing that the transfer unit T1 serves to actuate both the transfer arm 160 and the beam 166.

However, since the sprocket and chain drive just described receives its drive from the worm wheel shaft 180, the drive of the chain drive is continuous, i.e., it is not intermittent in the manner of the transfer arm. It will be noted, therefore, that the walking beam action is continuous.

Back and forth motion, as well as up and down motion, is transmitted to the movable beam 166 by means of a second crank 190 (Figure 1b), the crank pin 191 of which fits a round hole in the beam 166. This crank 190 is rotated by means of a chain driven sprocket 192 receiving its drive from a drive sprocket 193 of the second transfer unit T2. In this connection it is pointed out that the interior mechanism of the transfer unit T2, for effecting drive of the crank 190 and the second transfer arm 194, is the same as that just described in connection with the transfer unit T1 with the exception that the chain 183a also drives a third crank 195 for actuating the movable beam 196 of a second walking beam device W1 in its up and down movement, this second walking beam device being associated with the cooling unit C. Back and forth motion, as well as up and down motion, is transmitted to the movable beam 196 by means of a fourth crank 197 (Figure 1b) having a crank pin 198 fitting a round hole in the beam 196. This crank 197 is rotated by means of a chain driven sprocket 199 receiving its drive from a drive sprocket 200 of the third transfer unit T3 in a manner similar to the drive sprockets 181 and 193 of the transfer units T1 and T2.

Reverting now to the walking beam device of the blanching unit B1 it will be observed that the movable beam is associated with a toothed bar 210 extending longitudinally of the blanching unit and secured to the top flange 211 of the blanching tank 212 (Figures 1a, 2, 7 and 8), it being also observed that transfer units, movable beams, and toothed bars such as above described, are provided both at the front and rear of the machine to provide squared movement of the baskets in their traverse through the machine.

After a basket has been deposited in the first notches of the movable beams 166 these beams in their movement by the cranks 187 and 190 cause the studs of the baskets to ride up the inclines of the first teeth of the fixed bars 210 and then deposit it between the first and second teeth. As the beams continue their movement the basket is picked up by the second notches thereof, and then deposited between the second and third teeth and so on along the length of the walking beam device. Since basket after basket is deposited in this device it will be seen that baskets are carried in all of the teeth and they step along in unison throughout the length of the device and for each basket deposited at the input end by the transfer arm 160 a basket is removed at the output end by the transfer arm 194. Similarly for each basket deposited at the input end of the cooling unit C by the transfer arm 194 one is removed at the output end by the transfer arm 223. The transfer arms 194 and 223 are rotated through the 180 degrees necessary for the above transfer in the same manner as the arm 160.

It will be noted that the blanching tank 212 is suitably supported at a rather slight upward angle from its receiving end to its discharge end and that a water level is maintained therein. In Figures 1a and 1b the water level is indicated at 209, i.e., at the top of the adjustable wier plate 213. Suitable water supply and drain pipes are provided for the tank.

As best seen in Figures 1a, 1b, 7 and 8 a plurality of longitudinally spaced crosswise extending half round steam pipes 214 are welded to the bottom 215 of the blanching tank. These pipes are provided with nipples 216 adjacent their ends for connection into steam inlet and outlet manifolds 217 for circulating steam through the steam pipes.

By referring particularly to Figure 8 it will be seen that the spacing of the steam pipes 214 is such that when the baskets are seated in the teeth of the bars 210 the baskets are positioned substantially centrally over the spaced steam pipes and this, together with the inverted V bottoms of the baskets, causes a more or less localized roiling of the heated water in the region of each basket. Since the lower portions of the baskets are perforated roiling action also takes place within the baskets and results in very effective blanching of the spaghetti. The dipping down motion of the baskets with each step movement also causes a swirl to be set up to further ensure effective blanching.

The cooling tank C is supported at a substantial angle and has a water level maintained therein as indicated at 220 in Figure 1b. Fresh water is supplied to the cooling tank by an inlet pipe 221 and water overflowing the wier 219 is led off through a drain pipe 222. The baskets in the start of their step by step traverse up the inclined cooling tank dip into the water in the tank and as they progress in their movement beyond the water level in the tank the water is drained out of the baskets. The baskets containing the drained spaghetti are transferred to the turret unit T by the rotary transfer arm 223 of the third transfer unit T3 in the manner above explained in connection with the transfer arms 160 and 194.

The turret unit T (Figs. 1b, 4a, 4b, 6, 7 and 13) comprises a pair of end plates 224, one at each side of the machine, which are suitably secured to hub members 225 keyed on a transverse shaft 226 having bearings in the pillow blocks 227. The end plates are provided with six pairs of radial arranged spaced parallel ribs 228 and 229 functioning as will present appear. The end plates 224 are provided with notches 230 at their peripheries, one being at each of the spaced ribs 228 and 229. The end plates 224 are so spaced apart that the enlarged portions 231 of the basket studs 115 will seat in a registering notch 230 when a basket is transferred from the cooling tank to the turret. The ribs 228 and 229 are relatively shallow so as to clear the ends of the baskets.

As will be seen in Figure 13 as the transfer arm 223 approaches the turret in its transfer stroke the lower short studs 116 of the baskets engage the outer faces of the ribs 228, it being noted that the turret at this time has not yet reached its stop position. As the arm continues in its downward movement and the turret continues in its rotation, the studs ride down the rib and finally pass through the slots 232 at the bottom of the ribs and enter the space between the ribs. At this time the enlarged portions 231 of the upper basket studs seat in the registering notches 230 of the turret plates, as indicated in full lines in Figure 13.

During the next step movement of the turret, in the direction of the arrow, the transfer arm rotates in its return direction away from the basket and the short studs of the basket rides on the periphery of the hub flange 233. In the next 30° radial position of the basket the studs 115 of the baskets engage the guard rails 242 and the curved shield plate 234 which extends across the turret from end plate to end plate prevents the spaghetti from spilling out of the basket. In the next 30° radial position the basket assumes a vertical up side down position and empties its spaghetti in the waiting cans 234 at the waiting station S2, which cans have been positioned in proper spaced relation on a fixed supporting angle iron 236. The angle iron 236 is magnetized to prevent the cans being jarred out of their proper spaced relation. A suitably supported funnel member composed of sixteen funnels 237 is interposed between the turret and the cans to guide the spaghetti from the sixteen compartments of the basket into the sixteen waiting cans without spilling.

As best shown in Figures 13 and 14 a pivoted finger 238 is associated with of each of the rib slots 232 for the purpose of preventing the baskets from being displaced out of the radial positions during their travel in the lower half of the turret. The fingers 238 are pivotally mounted on rings 239 secured to the hubs 225 and are provided with cam rollers 240 operating in fixedly mounted face cams 241. Thus, the fingers rotate with the turret and the cams are so configured that as seen in Figure 13 the upper finger is fully open to enable the stud 116 to enter the slot 232, the next finger is partly closed, the next three fingers are closed to prevent displacement of the three lower baskets out of their radial positions and the last finger is partly open. The curved guard rail 242 prevents outward displacement of the basket in its travel from the funnels 237 to the inclined basket lowering conveyor RC.

It will be noted that the rib 228 of the turret which is positioned at the inclined basket lowering conveyor aligns with the inclined guide rail 243 of the conveyor; therefore, when the lug 244 carried by the conveyor chain 245 travels downwardly the basket slides from the turret onto the guide rail 243. When a basket on the inclined rail reaches the position of the lowermost basket shown in Figure 1b its downward movement by gravity is retarded by means of a pair of biased levers 246, one engaging the short stud at one end of the basket and the other engaging the short stud at the other end of the basket. These levers 246 not only serve to retard the basket, but also serve to square each basket as it arrives at this point, thus ensuring its being delivered to the horizontal return conveyor in squared relation to the conveyor belts. The chain lug 244 pushes the retarded basket to overcome the spring resistance of the levers 246. The baskets after being delivered onto the horizontal conveyor Hc are conveyed to the elevator pick up station S3 shown in Figure 1a where they engage the stop lugs 126 in position to be picked up by the elevator. The horizontal basket return conveyor is continuously driven by means of a motor 290 and gear reduction unit 291. The output shaft 292 of the reduction unit 291 is connected by chain drive to the transverse drive shaft 293 on which the drive pulleys 294 for the conveyor belt 295 are secured. Suitable supporting guide rollers 296 are provided for the belts. As is illustrated in Figure 1b belt tighteners 297 are provided for the belts.

The chains 245 of the inclined basket return conveyor are driven in intermittent or step by step movement by drive sprockets 247 (Figures 1b and 6) secured on a transverse shaft 248 which projects into a transmission unit 250 located at the front of the machine.

The transmission unit 250 (Figure 6) comprises a drive shaft 251 having a drive worm 252 in mesh with a worm wheel 253 which carries a pair of Geneva rollers adapted to operate in the slots of a driven Geneva wheel 254. The shaft 255 of the Geneva wheel has a spur gear 256 secured thereon which meshes with a spur gear 257 keyed on the sprocket drive shaft 248. Thus drive is transmitted to the inclined basket lowering conveyor.

The ratio of the gear 257 and gear 256 is one and one half to one, thus for each one quarter revolution of the Geneva wheel the gear 257 is rotated three-eighths of a revolution so as to move the conveyor chain an amount such that basket is conveyed through the desired distance. However, since the worm wheel 253 only has two Geneva rollers it will be seen that the above movement of the conveyor chain is only twice for each revolution of the worm wheel. This is for the purpose of co-ordinating the conveyor movement with the step rotation of the turret, as will further appear.

In addition the drive shaft 251 has a spur gear 260 keyed thereon which meshes with a spur gear 261 secured on the lay shaft 262. The lay shaft 262 extends into the housing of the third front transfer unit T3 and has a spur gear 263 secured thereon within the housing which meshes with a spur gear 264 secured on the worm shaft 265. The worm 266 of the worm shaft drives a worm wheel 267 carrying four Geneva rollers 268 adapted to operate in the slots 269 of a Geneva wheel 270 to drive it. Secured on the shaft of the Geneva wheel 270 is a spur gear 271 which meshes with a spur gear 272 secured on the shaft 162 of the transfer arm 223.

The worm wheel shaft 274 also has secured thereon the sprocket wheel 200 which by means of the chain 276 drives the sprocket wheel 199 secured on the shaft 278 of the walking beam crank 197.

The worm wheel 267 has a plate 279 secured thereto carrying a pair of Geneva rollers 280 cooperating with slots 281 in a Geneva wheel 282 to drive it. The Geneva wheel shaft 283 has a spur gear 284 secured thereon which meshes with a spur gear 285 secured on the turret shaft 226. Thus step by step movement is transmitted to the turret.

The ratio of the gear 272 to the gear 271 is two to one so that the transfer arm 223 is rotated through one half revolution for each one quarter revolution of the Geneva wheel 270 in the same manner as has been previously described in connection with the transfer arm 160.

The ratio of the spur gear 284 of the Geneva wheel 282 and the spur gear 285 of the turret T is one and one half to one, thus for each one quarter revolution of the Geneva wheel 282 the turret is rotated one sixth of a revolution or through 60° to position a notch of the turret to receive a basket from the transfer arm 223. Since the plate 279 only has two Geneva rollers, this 60° movement is only imparted to the turret twice for each revolution of the plate. The reason for this is to enable the transfer arm 223 to go through its 180° return movement during the period in which no advance of the turret is being made.

As has been pointed out above the movement of the inclined basket lowering conveyor is co-ordinated with the turret movement by the two roller actuations of the Geneva wheel of the transmission unit 250. The various transfer units above described and the transmission unit 250 are connected to receive drive from a common drive means which is the main drive motor 300 shown in Figure 2 and having driving connection with the transverse drive shaft 301 by means of the belt drive 302. This drive connection is shown in broken lines in Figure 1b. At the rear of the machine the transverse drive shaft 301 of the second transfer unit T2 by means of the bevel gears 303 and spur gears 304. This worm drive shaft is universally coupled to the worm drive shaft 170 of the first transfer unit T1 by means of the longitudinally extending shaft 305 and to the worm drive shaft of the third transfer unit T3 by an inclined universal shaft 306.

At the front of the machine the transverse drive shaft 301 is connected to drive the worm drive shaft of the second transfer unit T2 by means of bevel gears 307 and spur gears 308. This worm drive shaft is universally coupled to the worm drive shaft of the first transfer unit T1 by means of a longitudinally extending shaft 309 and to the drive shaft 251 of the transmission unit 250 (Figure 6). This drive shaft 251 is drivingly connected to the worm drive shaft 265 of the front third transfer unit T3 by means of gears 260, 261, shaft 262 and gears 263 and 264 as previously described. It will be noted that since the driving sprocket of the inclined basket return conveyor is incorporated in the transmission unit 250 and also the cam for actuating the can pusher device Cp to be presently described, the main drive motor 300 also constitutes a common drive for these devices.

Referring to Figure 1b it will be seen that the transverse shaft 301 through the medium of the bevel gears 303, shaft 310, bevel gears 311, shaft 312 and bevel gears 313 drives a lower shaft 314 extending toward the right hand end of the machine. This shaft is suitably drivingly coupled to a drive unit D of the pre-saucer unit P illustrated in Figures 21–24 now to be described.

The pre-saucer unit comprises a can feed screw or worm 320, the flights 321 of which are of a pitch to receive cans therebetween as shown in Figure 21. Empty cans are fed onto a platform 322 from a suitable can drop 323 and are advanced along the platform toward a star wheel 324. Located adjacent the feed screw 320 and paralleling the platform 322 and feed screw is a sauce tank 325 in this instance having sixteen faucets 326 spaced to correspond to the pitch of the feed worm and having nozzles 327 positioned centrally above the empty cans. When sixteen cans are fed into position under these nozzles a rotating cam 328, by means of a cam follower 329 and lever connections 330 (Figure 23), opens the faucets 326 to discharge a desired amount of sauce into the cans and as the cam continues in its rotation the faucets are closed.

The sauced cans are then fed along to the star wheel 324 which transfers them onto the cross conveyor Dc. When the first can abuts a stop 331 the remaining cans abut one against the other and are thus positioned in front of the can pusher device Cp.

The cross conveyor Dc is continuously driven by means of a motor 332 and gear reduction unit 333, the output shaft 334 of which has secured thereon the drive pulley 335 of the conveyor belt 366. A suitable belt tightener 367 (Figure 4a) is provided for the conveyor belt.

The drive unit D of the pre-saucer unit P comprises a power input shaft 338 drivingly connected with the drive shaft 314 (Figure 1b) as by means of a chain and sprockets. The shaft 338 has a worm drive connection 339 with the cam shaft 340 of a Ferguson roller gear drive of well known form employing a cam 341 suitably configured to rotate the roller shaft 342 one half revolution during 90° of cam rotation and to have the roller shaft dwell during the remaining 270° of cam rotation. The upright roller shaft 342 has a four to one spur gear connection 343 with the upright shaft 344 which has the star wheel 324 of the pre-saucer unit P secured thereon at its upper end. The ratio of drive is such that the star wheel 324 is driven two revolutions during one quarter cycle of the machine and since the star wheel has eight teeth, sixteen cans will be delivered to the can delivery conveyor Dc per two revolutions of the star wheel.

The upright shaft 344 also has a one to two ratio helical gear drive connection 345 to a shaft 346 having a four to one sprocket and chain drive connection with the can feed screw or worm 320 of the pre-saucer unit P. Thus, the can feed screw rotates sixteen revolutions during one quarter cycle of the machine and since the pitch of this feed screw is such as to advance one can per revolution to the star wheel 324 it will be seen that sixteen cans are delivered thereto during the two revolutions of the star wheel.

The drive unit D also has the actuating cam 328 of the faucets 326 secured on the continuously rotating shaft 340 so that the faucets will be opened and closed once for each revolution of the shaft 340, the cam being configured to accomplish this at the time cans are stopped in position under the faucets by the can feed screw 320.

In connection with the faucets 326 it is pointed out that an air operated piston and cylinder 347 is associated therewith (Figure 23) which, when actuated, causes its piston rod to engage a lever 348 secured on the rock shaft of the cam roller levers 330 to hold the cam roller in its out or faucet closing position. Thus, even though the cam is in rotation the faucets can be held closed by the piston and cylinder 347 to enable, for example, removal for weighing and inspecting the cans without stopping the machine and without spilling sauce.

The can pusher device Cp comprises a carriage 350 having a transverse front pusher plate 351 and a plurality of spaced plates 352 arranged crosswise of the carriage and spaced to correspond to the desired spacing of the cans as is clearly shown in Figures 4a, 4b, and 21. The carriage 350 is moved back and forth on suitable guide tracks by means of a cam 353, cam follower 354 and lever and link connections 355, as best seen in Figure 6. The cam follower is maintained in contact with the cam and the carriage is biased toward advanced position by a link 356 and spring 357 one end of which bears against a collar 358 fixed on the link and the other end of which bears against a block 359 pivotally mounted on adjacent supporting structure 360 of the machine.

The cam 353 is mounted on the worm wheel shaft 361 of the transmission unit 250 previously described. With the cam in the position shown in Figure 6 the cam follower is at the low point of the cam and the can pusher carriage is in advanced position, i.e., the position in which the cans 235 have been pushed off the conveyor Dc and onto the stationary can support 236. As the cam rotates the cam follower rides on the high surface of the cam and moves the carriage to retracted position as shown in Figure 1b. It is to be observed that as the carriage moves from the retracted position of the Figure 1b to the advanced position of Figure 6 the spacer plates 352 enter between the cans to properly space them on the fixed magnetized support 236 in registry with the spaghetti discharge funnels 237.

It will be noted that when the cans are pushed from the conveyor Dc onto the support 236 the previously spaghetti filled cans are pushed off the support 236 by these cans and deposited on the adjacent filled can delivery conveyor Fc which conveys them to an accumulating station 362 indicated in Figure 21.

As seen in Figures 1b and 6 a fixed can guard rail 363 is provided adjacent the rear edge of the conveyor Dc to guide the cans in their run. This rail is provided with spaced slots 364 for the spacer plates 352. Extending lengthwise between the conveyor Dc and the stationary can support 236, a retractable guard fence 365 is provided. This guard fence is moved to its up or guiding position, as shown in Figure 1b, when the can pusher carriage 350 is moved into its retracted position, by means of a lever 366 pivotally mounted in a bracket 367 and having a roller 368 which is engageable by the lug 369 of the carriage. When the carriage is moved in its pushing direction the guard fence 365 is retracted downwardly under influence of the spring 370 to the position shown in Figure 6. The guard fence 365 is provided with a downwardly extending arm 371 to which the free end of a lever 372 pivoted in the bracket 367 is connected. This lever carries a plate 373 having a cam follower 374 in contact with a cam 375 secured on a cam shaft 376. This cam serves to raise the guard fence 365 when the pusher reaches the advanced position and hold it in the up position until the pusher has moved to the retracted position.

The cam shaft 376 is connected to receive its drive from the continuously rotating shaft 340 of the presaucer drive unit D as by means of chain and sprocket connection 377 to rotate one revolution for each revolution of the shaft 340. The cam 375 is secured on the shaft 376 so that it arrives at its high position, shown in broken lines in Figure 6, after the can pusher 351 has pushed the cans just delivered to the conveyor Dc onto the fixed angle iron 236 and as the can pusher 351 is being retracted. Thus, the guard fence is moved upwardly behind these cans to prevent rearward displacement thereof should they be bumped by cans being conveyed along by the filled can conveyor Fc at this time.

Referring now to the cycle chart of Figure 31 and to the diagrammatic views of Figures 25–30 it is pointed out that in Figures 1a and 1b the parts are shown in the positions they assume at the three quarter cycle line of the cycle chart. Tracing this line downwardly in conjunction with Figures 1a and 1b it will be seen that the trim cut knife 56 is at rest in its back position, the cut-off knife tilt 73 is at rest in its back position, the cut-off knife tilt has tilted the knife into position, the basket linear transfer push bar 151 is in retracted position, the basket elevator E is at rest, the horizontal basket return conveyor Hc is moving, the transfer arms of the three transfer units T1, T2 and T3 are in their transfer stroke, the turret of the unit T approaching its rest position, the inclined basket lowering conveyor Rc is at rest and the can pusher carriage 350 is in retracted position. The above also applies the parts as shown in Figure 25.

In Figure 26 the parts are in the positions they assume at the one half second line of the cycle chart. At this point in the cycle all of the parts are in the positions just described with the exception of the trim cut knife 56 which has trimmed the strands of spaghetti and has moved to its fore position, and the rotary transfer arms which have started to move in their return movement and the inclined basket return conveyor which is now moving.

In Figure 27 the parts are in the positions they assume at the three quarter second point of the cycle chart in which the trim cut knife 56 is at rest in its fore position, the cut-off knife 73 has cut off the strands of spaghetti and moved to its fore position, the cut-off knife tilt is in up position, the basket push bar 151 remains in retracted or back position, the basket elevator remains at rest, the transfer arms continue in their return movement, the turret remains at rest, the inclined basket return conveyor continues moving and the can pusher carriage starts its fore movement.

In Figure 28 the parts are in the positions they assume just slightly before the one second line of the chart. At this point all of the parts are just described in connection with Figure 27 with the exception of the cut-off knife 73 which is in its return movement and the cut-off knife tilt which has tilted the cut-off knife downwardly.

In Figure 29 the parts are in the positions they assume at the one second line of the chart in which the only change is that the cut-off knife is in its full return position, it being particularly noted that the cut-off knife tilt is still holding the cut-off knife downwardly and that the can pusher is still in its fore stroke.

In Figure 30 the parts are in the positions they assume at the four second line of the chart in which the trim cut knife has returned to its back position, the cut-off knife 73 is in its back position, the cut-off knife tilt has tilted the cut-off knife upwardly, the basket linear transfer push bar 151 is in its retracted position after having transferred a basket onto the fixed bars 150 for pick up by the rotary transfer arms of the transfer unit T1, the basket elevator is approaching the end of its left stroke to bring a basket up to the spaghetti filling station, the basket rotary transfer arms have started moving in their pick up direction, the turret has started in its rotation, the inclined basket conveyor is at rest and the can feed pusher is again back at rest.

Although the cycle chart of Figure 31 is based on 6.86 seconds operation per cycle, it is pointed out that this can be increased or decreased by corresponding change in the r.p.m. of the main drive motor 300.

Figure 32 diagrammatically illustrates the hydraulic system for the various hydromotors and for the cut-off knife tilt cylinder. The motor 378 drives the pump 380 to deliver fluid from the reservoir 381 to a supply line 382 leading to valve manifold 383 of five solenoid operated 4-way control valves of the well known type employing two momentarily actuated solenoids to flip the valves into either of two control positions where they remain until moved by momentarily actuation of the solenoid in the opposite direction. Valve 384 is connected to control the trim knife hydromotor 63. Valve 385 is connected to control the cut-off knife hydromotor 75. Valve 386 is connected to control the cut-off knife tilt cylinder 90. Valve 387 is connected to control the basket elevator hydromotor 132. Valve 388 is connected to control the linear transfer hydromotor 155. A suitable accumulator 389, shut off valve 390, check valve 391, unloading valve 392, relief valve 393 and flow control valves 394 are incorporated in the system. The switches controlling the above control valve will be described in connection with the wiring diagram.

Referring to the schematic control circuit illustrated in Figure 33, when starting the machine in operation the circuit breaker 400 is closed to energize transformer 401. When the start switch 402 is then pressed the contacts 403 close to by-pass the switch and if the normally open contacts 404 of auxiliary controls of the machine (not shown) are closed the motor circuit is completed through the interlock 405. A stop switch 406 and a jog switch 407 are included in this circuit.

A cycle driven electrical contactor 395 of well known form is conveniently located at a side of the machine as indicated in Figure 1a. Four cam contacts CC1, CC2, CC3 and CC4 included therein will now be described.

Referring to the schematic diagram of Figure 34, closing of the cam contacts CC2 energizes the trim knife forward solenoid 410 of the valve 384 (Figure 31). Relay 412 is also energized to close its contacts 413, 414 and to open its contacts 415. Contacts 413 by-pass contacts CC1 to hold the energization of the relay.

Switch LS3 actuated by the trim knife hydromotor 63 closes when the trim knife reaches its forward position. This energizes cut-off knife forward solenoid 416 of the valve 385 because contacts 414 and contacts CC2 were previously closed.

Contacts 417 of switch LS4 are opened when this switch is actuated by the cut-off knife hydromotor 75, when it reaches its forward position, thus de-energizing relay 412 to open its contacts 413, and 414 and to close its contacts 415. Contacts 418 which are ganged with contacts 417 of switch LS4 close, energizing cut-off knife return solenoid 419 of valve 385 and cut-off knife tilt down solenoid 420 of valve 386. The opening of contacts 414 de-energized cut-off knife forward solenoid 416.

The switch LS4 is returned to normal by the cut-off knife hydromotor 75 when the cut-off knife has tilted down and returned.

Switch LS5 is closed by the cut-off knife hydromotor 75 after the cut-off knife returns. This energizes cut-off knife tilt up solenoid 421 of valve 386. Switch LS5 remains closed and the current controlling the knife is cut off by cam contacts CC2.

The linear pusher forward cam contacts CC3 close energizing the pusher forward solenoid 422 of valve 388. Also trim knife return solenoid 411 is energized.

Switch LS6 is momentarily closed when the linear transfer pusher hydromotor 155 reaches the end of its forward stroke. This energizes the linear pusher return solenoid 423 of valve 388.

The horizontal return conveyor switches LS8 and LS9 are closed only if a basket is in position on this conveyor at the elevator pick up station S3. If the switches LS8 and LS9 are closed before LS6 is momentarily closed the elevator operating mechanism down solenoid 424 of valve 387 will be energized to raise the elevator and lift a basket. If LS8 and LS9 are open at the time LS6 closes the elevator does not function.

In this connection it should be noted that the elevator is moved in its up or lift travel when the hydromotor crank 133 and attached rack 134 of the elevator raising mechanisms are moving in downward travel. When the hydromotor crank 133 reaches the end of its down stroke the switch LS2 is momentarily closed and the elevator operating mechanism up solenoid 425 of valve 387 is energized to cause the rack 134 to move upwardly. In this movement the ratchet wheel of this mechanism remains idle so that no drive is transmitted to the elevator.

In connection with the knife operation attention is directed to the fact that the control of the cut-off knife is so arranged that the downward tilting of the knife occurs immediately at the completion of its cutting stroke, that the return of the knife to its back position follows immediately after the downward tilt, that the upward tilt does not occur until the knife has reached the full back position of its return stroke, and that the cut-off knife is actuated in its cut-off stroke immediately after the trim knife has trimmed the strands of spaghetti so that the strands do not have a chance to grow, so to speak, before they are cut off. This ensures that the strands will be of the exact predetermined length desired.

If for any reason returning baskets should jam up in the inclined return conveyor Rc, these may easily be removed or released by operation of the hand lever 399 (Figure 1b) to lower the guide rails 243 so as to provide access space.

A ventilating hood 396 having inlet and outlet ducts 397 and 398 is located over the blanching unit B1 and over part of the cooling unit C as shown in Figures 1a and 1b.

In instances where direct delivery of the cut-off strands of spaghetti from the trim and cut-off knife unit K into cans is desired the arrangement illustrated in Figure 35 is employed.

In such cases the can delivery conveyor Dc, the feed screw or worm 320 and the can pusher device Cp are located in direct association with the knife unit K as shown, and suitable strand chutes 450 are interposed between the bottom of the strand chutes 72 and the waiting cans 235.

It will thus be seen that the strands of spaghetti after being cut off by the cut-off knife 73 fall downwardly through the chutes 72 and 450 and are deposited in the waiting cans.

I claim:

1. Apparatus for forming spaghetti sections of predetermined length comprising; a die plate, means defining a plurality of openings extending in a substantially vertical direction through said die plate, means to extrude dough downwardly through said openings to form depending strands of spaghetti, trim and diverting means positioned beneath and spaced from said die plate, means to actuate said trim and diverting means to cause said trim and diverting means to move substantially transversely through the depending strands to trim the lower ends of the strands and engage the trimmings cut from the lower ends to divert the trimmings away from said depending strands, a cut-off knife positioned adjacent said die plate above said trim and diverting means, means to actuate said cut-off knife after actuation of said trim and diverting means to cut said depending strands into divided sections of predetermined length and permit said divided sections to fall downwardly, and means to collect said divided sections separately from said trimmings.

2. Apparatus in accordance with claim 1 wherein said movable trim and diverting means and cut-off knife are spaced from one another a predetermined distance and wherein said cut-off knife is actuated to move through the dependent strands immediately after actuation of said trim and diverting means to cut said strands into sections of predetermined uniform length.

3. Apparatus in accordance with claim 1 wherein said trim and diverting means comprises a trim knife and a separate member movable in timed relation with said trim knife to cause relative angular movement between the trimmed strands and the trimmings cut from said strands, and a conveyor operable to receive said trimmings and convey the same away from said trim knife and said depending strands.

4. Apparatus for deforming spaghetti sections of predetermined length for reception by a container comprising; a die plate, means defining a plurality of openings extending in a substantially vertical direction through said die plate, means for extruding dough downwardly through said die openings to form a plurality of depending strands of spaghetti, means to support the container to receive said spaghetti sections in a predetermined position beneath said die plate, a chute positioned intermediate said die plate and container operable to confine said spaghetti sections along a predetermined downward path to said container, a trim knife positioned adjacent said chute below and relatively remote from said die plate, said trim knife movable through the depending strands to trim the lower ends of said strands, diverting means associated with said trim knife to receive the trimmings cut from the lower ends of said strands and convey the same away from said chute, a cut-off knife positioned above said trim knife adjacent said die plate movable through the depending strands to cut said strands into sections and permit the said sections to fall substantially freely through said chute into said container, and means to actuate said cut-off knife after said trim knife trims the lower ends of said strands.

5. Apparatus in accordance with claim 4 wherein said die plate has a plurality of spaced groups of openings therein and wherein means are provided to position a plurality of containers corresponding in number to said plurality of groups of openings in a predetermined position beneath said die plate with one container beneath each group of openings.

References Cited in the file of this patent

UNITED STATES PATENTS

| | | |
|---|---|---|
| 1,029,059 | Gammel | June 11, 1912 |
| 1,074,977 | Provost | Oct. 7, 1913 |
| 1,487,324 | Fontana | Mar. 18, 1924 |
| 1,553,573 | Tanzi | Sept. 15, 1925 |
| 1,954,443 | Doolin | Apr. 10, 1934 |
| 2,013,906 | Boiardi | Sept. 10, 1935 |
| 2,120,437 | Feese | June 14, 1938 |
| 2,223,352 | De Francisci | Dec. 3, 1940 |
| 2,286,644 | Pringle et al. | June 16, 1942 |
| 2,308,552 | Spinozzi | Jan. 19, 1943 |
| 2,366,366 | Souder | Jan. 2, 1945 |
| 2,463,112 | Kipnis | Mar. 1, 1949 |
| 2,481,275 | Ambrette | Sept. 6, 1949 |
| 2,622,545 | Hummel | Dec. 23, 1952 |

FOREIGN PATENTS

| | | |
|---|---|---|
| 484,893 | Canada | July 15, 1952 |